United States Patent
Au et al.

(10) Patent No.: US 12,360,978 B1
(45) Date of Patent: Jul. 15, 2025

(54) DATA TYPE BASED AGGREGATION OF MULTIPLE LINKED TABLES FOR MACHINE LEARNING TASKS

(71) Applicant: Fujitsu Limited, Kawasaki (JP)

(72) Inventors: Wing Yee Au, Saratoga, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/411,095

(22) Filed: Jan. 12, 2024

(51) Int. Cl.
 *G06F 16/22* (2019.01)
 *G06F 16/25* (2019.01)
 *G06F 16/28* (2019.01)
 *G06F 18/2321* (2023.01)

(52) U.S. Cl.
 CPC ........ *G06F 16/2282* (2019.01); *G06F 16/258* (2019.01); *G06F 16/285* (2019.01); *G06F 18/2321* (2023.01)

(58) Field of Classification Search
 CPC ............ G06F 16/1794; G06F 16/2282; G06F 16/2321; G06F 16/258; G06F 16/285; G06F 18/2321
 See application file for complete search history.

(56) References Cited

U.S. PATENT DOCUMENTS

| | | | |
|---|---|---|---|
| 8,365,138 B2 * | 1/2013 | Iborra | G06F 16/2365 717/113 |
| 10,635,645 B1 * | 4/2020 | Abushwashi | G06F 16/2358 |
| 11,042,516 B2 * | 6/2021 | Vandiver | G06F 16/2282 |
| 2016/0078064 A1 * | 3/2016 | Sassin | G06F 16/211 707/606 |
| 2021/0342785 A1 * | 11/2021 | Mann | G06F 40/186 |
| 2022/0164332 A1 * | 5/2022 | Hoang | G06F 16/2456 |

OTHER PUBLICATIONS

Krogel, Mark-A., et al., "Transformation-based learning using multirelational aggregation." Inductive Logic Programming: 11th International Conference, ILP 2001 Strasbourg, France, Sep. 9-11, 2001 Proceedings 11. Springer Berlin Heidelberg, 2001.

Gray, Jim, et al., "Data cube: A relational aggregation operator generalizing group-by, cross-tab, and sub-totals." Data mining and knowledge discovery 1 (1997): 29-53.

(Continued)

*Primary Examiner* — James E Richardson
(74) *Attorney, Agent, or Firm* — Fujitsu Intellectual Property Center

(57) ABSTRACT

In an embodiment, relational data that includes a parent table and a set of linked tables associated with the parent table is received. Thereafter, a set of operations is executed. The set of operations comprises selecting a linked table and determining a data type that is associated with each column. The set of operations further comprises determining a set of transformations comprising determining a set of features corresponding to each primary key in the parent table. The set of operations further comprises generating one or more aggregate features corresponding to each primary key and updating an aggregate table to include the one or more aggregate features under one or more new columns. The execution of the set of operations is repeated on other linked tables to obtain the updated aggregate table. Thereafter, a machine learning model is trained.

20 Claims, 9 Drawing Sheets

(56) References Cited

OTHER PUBLICATIONS

Schulte, Oliver, et al., "Aggregating predictions vs. aggregating features for relational classification." 2014 IEEE Symposium on Computational Intelligence and Data Mining (CIDM). IEEE, 2014.
Pellegrini, Giovanni, et al., "Learning Aggregation Functions." Thirtieth International Joint Conference on Artificial Intelligence (IJCAI-21).
Kipf Thomas N., et al., "Semi-supervised classification with graph convolutional networks," ICLR 2017 arXiv:1609.02907v4 [cs.LG] Feb. 22, 2017.
Corso, Gabriele, et al. "Principal Neighbourhood Aggregation for Graph Nets." 34th Conference on Neural Information Processing Systems (NeurIPS 2020). arXiv:2004.05718v5 [cs.LG] Dec. 31, 2020.
Jensen, David, et al., "Avoiding bias when aggregating relational data with degree disparity." Proceedings of the 20th International Conference on Machine Learning, pp. 274-281 (ICML-03) Aug. 2003.
Ohori, Kotaro, et al. "Wide Learning Technology to Provide Trust Through Knowledge Discovery." Fujitsu Scientific & Technical Journal 56.1 (2020): 46-51.
Saha Ripon K., et al. "SapientML: synthesizing machine learning pipelines by learning from human-writen solutions." Proceedings of the 44th International Conference on Software Engineering. 2022 (ICSE 2022), May 21-29, 2022. arXiv:2202.10451v2 [cs.LG] Apr. 19, 2022.

\* cited by examiner

DATA TYPE BASED AGGREGATION OF MULTIPLE LINKED TABLES FOR MACHINE LEARNING TASKS

FIELD

The embodiments discussed in the present disclosure are related to data type-based aggregation of multiple linked tables for machine learning tasks.

BACKGROUND

Advancements in the field of data storages have led to development of relational databases that may store consolidated data collections. However, a typical machine learning model may be applied on a single tabular dataset. Therefore, relational data may need to be transformed into a single tabular format. Conventionally, a database join process may be employed for combining columns from multiple linked tables into a new table. Feature aggregation functions may be used for grouping together values of multiple rows to determine a single value. However, usage of such feature aggregation functions may lead to loss of information related to a distribution of features. Further, each feature aggregation functions may need to be applied individually as the machine learning model may not be able to learn one aggregation (for example, a maximum value) from other aggregations (for example, a minimum value) even though the aggregations may be mathematically related to each other. Such individual usage of the aggregation functions may lead to an explosion of features that the machine learning model may need to be trained upon. This may result in a bias in the trained machine learning model. Moreover, an accuracy of the trained machine learning model may degrade. Relational aggregations may be an intensive manual operation and a subject matter expert having a knowledge of the relational data may be needed to determine a suitable singular table.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving relational data that includes a parent table and a set of linked tables associated with the parent table. The set of operations may further include executing a set of operations comprising selecting a linked table from the set of linked tables. The set of operations may further include determining a data type that is associated with each column of the selected linked table. The set of operations may further include determining a set of transformations based on the determined data type. The set of operations may further include determining, from each column of the linked table, a set of features corresponding to each primary key in the parent table. The set of operations may further include generating one or more aggregate features corresponding to each primary key in the parent table by applying the set of transformations on the set of features. The set of operations may further include updating an aggregate table to include the one or more aggregate features under one or more new columns of the aggregate table. The set of operations may further include repeating the execution of the set of operations on other linked tables of the set of tables to obtain the updated aggregate table. The set of operations may further include training a machine learning model based on the updated aggregate table.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
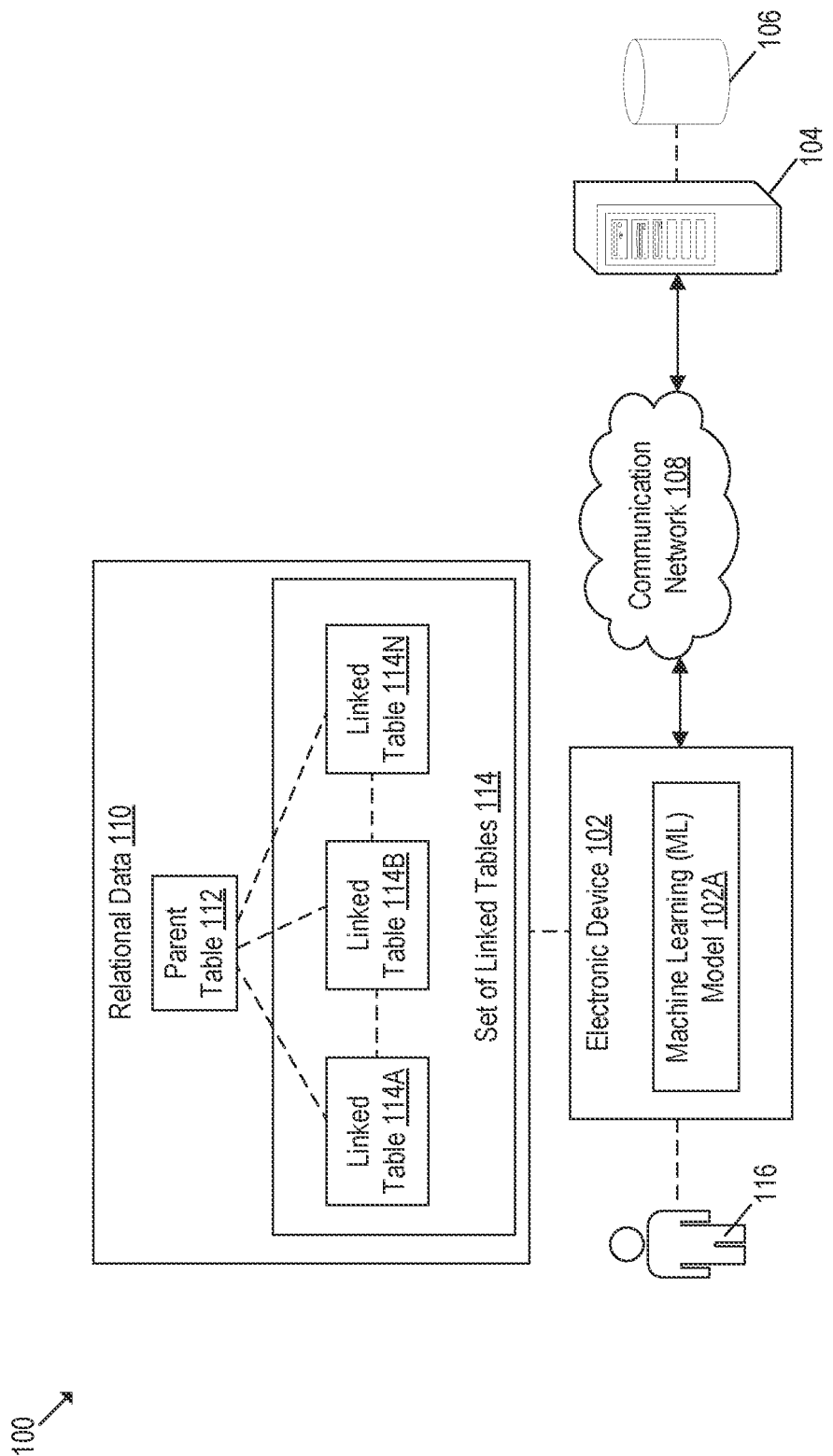
FIG. 1 is a diagram representing an example environment related to data type-based aggregation of multiple linked tables for machine learning tasks.

all according to at least one embodiment described in the present disclosure.

DESCRIPTION OF EMBODIMENTS

Some embodiments described in the present disclosure relate to methods and systems for data type-based aggregation of multiple linked tables for machine learning tasks. In the present disclosure, relational data that may include a parent table and a set of linked tables associated with the parent table may be received. A set of operations may be executed. The set of operations may include selecting a linked table from the set of linked tables. The set of operations may further include determining a data type that is associated with each column of the selected linked table. The set of operations may further include determining a set of transformations based on the determined data type. The set of operations may further include determining, from each column of the linked table, a set of features corresponding to each primary key in the parent table. The set of operations may further include generating one or more aggregate features corresponding to each primary key in the parent table by applying the set of transformations on the set of features. The set of operations may further include updating an aggregate table to include the one or more aggregate features under one or more new columns of the aggregate table. Thereafter, the execution of the set of operations may be repeated on other linked tables of the set of tables to obtain the updated aggregate table. A machine learning model may be trained based on the updated aggregate table.

According to one or more embodiments of the present disclosure, the technological field of data type-based aggregation of multiple linked tables for machine learning tasks may be improved by configuring a computing system in a manner that the computing system may be able to obtain an updated aggregate table. The computing system may determine a data type that may be associated with each column of a selected linked table. Thereafter, a set of transformations may be determined based on the determined data type. The determined data type may be a numeric data type, a date-time data type, a vector data type, or a categorical data type. The set of transformations may be thus different for the different data types. Usage of the set of transformations that may be different for the different data types may lead to maximal retention of information associated with a set of features. An aggregate table may be updated to include the one or more aggregate features under one or more new columns of the aggregate table. A machine learning model may be trained based on the updated aggregate table.

It may be appreciated that relational data may be represented by multiple data tables, each of which may have values that may be linked with other data tables. The links may denote relationships between table entries. However, a typical machine learning model may be applied on a single tabular dataset. Therefore, the relational data may need to be transformed into a single tabular format. Conventionally, a database join process may be employed for combining columns from multiple linked tables into a new table. Herein, feature aggregation functions may be used for grouping together values of multiple rows to determine a single value. However, usage of such feature aggregation functions may lead to loss of information related to a distribution of features. Further, each feature aggregation functions may need to be applied individually as a machine learning model may not be able to learn one aggregation (for example, a maximum value) from other aggregations (for example, a minimum value) even though the aggregations may be mathematically related to each other. Such individual usage of the aggregation functions may lead to an explosion of features that the machine learning model may need to be trained upon. This may result in a bias in the trained machine learning model. Moreover, an accuracy of the trained machine learning model may degrade. Furthermore, relational aggregations may be an intensive manual operation and a subject matter expert having a knowledge of the relational data may be needed to determine a suitable singular table. Alternatively, a graph neural network approach may be used for joining linked tables. However, transforming the relations into a graph and training the graph neural network may not be scalable for scenarios when the linked tables are complex and have a considerable number of features and links.

The present disclosure may provide a method that facilitates data type-based aggregation of multiple linked tables for machine learning tasks. For such data type-based aggregations, an electronic device of the present disclosure may employ a method to perform automated and high accuracy machine learning tasks on the relational data. The disclosed method may allow usage of information from the set of linked tables in a tabular format. Further, the columns of different data types in the set of linked tables may be aggregated. Herein, the data type may be the numeric data type, the date-time data type, the vector data type, or the categorical data type. Further, an effect of column explosive caused by deeply linked tables and multitude of aggregation functions may be automatically mitigated.

Embodiments of the present disclosure are explained with reference to the accompanying drawings.

FIG. 1 is a diagram representing an example environment related to a data type-based aggregation of multiple linked tables for machine learning tasks, according to at least one embodiment described in the present disclosure. With reference to FIG. 1, there is shown an environment 100. The environment 100 may include an electronic device 102, a server 104, a database 106, and a communication network 108. The electronic device 102 and the server 104 may be communicatively coupled to one another, via the communication network 108. The electronic device 102 may store a machine learning (ML) model 102A locally and relational data 110. The relational data 110 may include a parent table 112 and a set of linked tables 114. The set of linked tables 114 may include N number of linked tables, such as a table 114A, a table 114B . . . , a table 114N. In an embodiment, the parent table 112 may be linked individually to each of the set of linked tables 114. In another embodiment, the parent table 112 may be linked to one linked table of the set of linked tables 114 and each linked table of the set of linked tables 114 may be linked to one or more other linked tables of the set of linked tables 114.

The number of linked tables shown in FIG. 1 are presented merely as an example. In some embodiments, the set of linked tables 114 may include two or more than two linked tables, without a deviation from the scope of the disclosure. For the sake of brevity, only three linked tables have been shown in FIG. 1. In FIG. 1, there is further shown a user 116, who may be associated with or operate the electronic device 102.

The electronic device 102 may include suitable logic, circuitry, and interfaces that may be configured to perform data type-based aggregation of multiple linked tables for machine learning tasks. The electronic device 102 may be configured to receive the relational data 110 that may include the parent table 112 and the set of linked tables 114 associated with the parent table 112. The electronic device 102 may be further configured to execute a set of operations to create and update an aggregate table, that unifies data from the set of linked tables 114 and the parent table 112 into a single table. Further, the electronic device 102 may be configured to train the ML model 102A based on the updated aggregate table. Examples of the electronic device 102 may include, but are not limited to, a computing device, a hardware-based annealer device, a digital-annealer device, a quantum-based or quantum-inspired annealer device, a smartphone, a cellular phone, a mobile phone, a gaming device, a mainframe machine, a server, a computer workstation, and/or a consumer electronic (CE) device.

The ML model 102A may be a supervised or unsupervised learning model which may be trained to identify a relationship between inputs, such as features in a training dataset and/or target values in the training dataset. The ML model 102A may be defined by its hyper-parameters, for example, number of weights, cost function, input size, number of layers, and the like. The parameters of the ML model 102A may be tuned and weights may be updated so as to move towards a global minima of a cost function for the ML model 102A. After several epochs of the training on the feature information in the training dataset, the ML model 102A may be trained to output a result or a prediction for a set of inputs.

The ML model 102A may include electronic data, which may be implemented as, for example, a software component of an application executable on the electronic device 102.

The ML model 102A may rely on libraries, external scripts, or other logic/instructions for execution by a processing device. The ML model 102A may include code and routines configured to enable a computing device to perform one or more operations such as determination of the set of session slots. Additionally, or alternatively, the ML model 102A may be implemented using hardware including a processor, a microprocessor (e.g., to perform or control performance of one or more operations), a field-programmable gate array (FPGA), or an application-specific integrated circuit (ASIC). Alternatively, in some embodiments, the ML model 102A may be implemented using a combination of hardware and software.

In an embodiment, the ML model 102A may be a NN model. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function.

In training of the neural network, one or more parameters of each node of the neural network may be updated based on whether an output of the final layer for a given input (from the training dataset) matches a correct result based on a loss function for the neural network. The above process may be repeated for the same or a different input until a minima of a loss function is achieved, and a training error is minimized. Several methods for training are known in art, for example, gradient descent, stochastic gradient descent, batch gradient descent, gradient boost, meta-heuristics, and the like.

The neural network may include electronic data, which may be implemented as, for example, a software component of an application executable on the electronic device 102. The neural network may rely on libraries, external scripts, or other logic/instructions for execution by a processing device. The neural network may include code and routines configured to enable a computing device to perform one or more operations for determination of the set of session slots. Additionally, or alternatively, the neural network may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

The server 104 may include suitable logic, circuitry, and interfaces, and/or code that may be configured to perform the data type-based aggregation of multiple linked tables for machine learning tasks. For example, the server 104 may be configured to repeat the execution of the set of operations on other linked tables of the set of tables 114 to obtain the updated aggregate table. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that may be well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The database 106 may include suitable logic, interfaces, and/or code that may be configured to store the updated aggregate table. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for the updated aggregate table from the electronic device 102. In response, the device of the database 106 may be configured to retrieve and provide the queried updated aggregate table to the electronic device 102 based on the received query. In some embodiments, the database 106 may be hosted on a plurality of servers stored at same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104, (and the device hosting the database 106) may communicate. The communication network 108 may be one of a wired connection or a wireless connection. Examples of the communication network 108 may include, but are not limited to, the Internet, a cloud network, Cellular or Wireless Mobile Network (such as, Long-Term Evolution and 5G New Radio), a Wireless Fidelity (Wi-Fi) network, a satellite network (e.g., a network of a set of low earth orbit satellites), a Personal Area Network (PAN), a Local Area Network (LAN), or a Metropolitan Area Network (MAN). Various devices in the environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The relational data 110 may include data points that may be related to one another. The relational data 110 may represented by multiple data tables, such as the parent table 112 and the set of linked tables 114. Each table of the parent table 112 and the set of linked tables 114 may include values that may be linked with one or more other tables of the set of linked tables 114. The link may denote relationships between values of tables. For example, for payment fraud detection, the relational data 110 may include three tables such as Untagged Transactions, Account Info, and Fraud Transactions that may be linked with each other using one or more keys.

In operation, the electronic device 102 may receive the relational data 110 that may include the parent table 112 and the set of linked tables 114 associated with the parent table 112. It may be appreciated that each table of the parent table 112 and the set of linked tables 114 may include values that may be linked with other tables of the set of linked tables 114. Herein, each link may denote a relationship between the corresponding tables. Details related to the reception of the relational data 110 are further provided, for example, in FIG. 3A (At 302).

The electronic device 102 may execute a set of operations. The set of operations may include selecting a linked table from the set of linked tables 114. The linked table that may be associated with the parent table 112 may be selected. As an example, the linked table 114A may be selected from the set of linked tables 114. Details related to the selection of the linked table 114A are further provided, for example, in FIG. 3A (At 304).

The set of operations may further include determining a data type that is associated with each column of the selected linked table 114A. It may be appreciated that the selected linked table 114A may include a plurality of columns of different data types. As an example, the selected linked table 114A may include a first column of a numeric data type, a second column of a date-time data type, a third column of a vector data type, and a fourth feature of a categorical data type. Details related to the determination of the data type are further provided, for example, in FIG. 3A (At 306).

The set of operations may further include determining a set of transformations based on the determined data type. The determined set of transformations may be different for different data types. In case the determined data type is the numeric data type, then the set of transformations may be one or more numeric feature aggregation operations. In case the determined data type is the categorical data type, then the set of transformations may be one or more categorical feature aggregation operations. Details related to the determination of the set of transformations are further provided, for example, in FIG. 3A (At 308).

The set of operations may further include determining, from each column of the linked table 114A, a set of features corresponding to each primary key in the parent table 112. As an example, the primary keys may correspond to a customer identification (ID) number. A first column of the parent table 112 and a first column of the linked table 114A may include the customer ID numbers. A customer ID number "A1" may be present once in the first column of the parent table 112. Moreover, the customer ID number "A1" may be present twice in the first column of the linked table 114A. Thus, a sub-table may be extracted from the linked table 114A. The extracted sub-table may include rows corresponding to the customer ID number "A1". Details related to the determination of the set of features are further provided, for example, in FIG. 3A (At 310).

The set of operations may further include generating one or more aggregate features corresponding to each primary key in the parent table 112 by applying the set of transformations on the set of features. Herein, the set of features may be provided as an input to the determined set of transformations. In an example, the selected linked table 114A may include a first column of a numeric data type. Herein, the one or more numeric feature aggregation operations may be applied on the set of features associated with the first column. Details related to the generation of the one or more aggregate features are further provided, for example, in FIG. 3A (At 312).

The set of operations may further include updating an aggregate table to include the one or more aggregate features under one or more new columns of the aggregate table. Herein, columns of the parent table 112 may be retained as it is. Thereafter, one or more new columns may be added. As an example, the one or more aggregate features may be a maximum value of a set of features and a second aggregate feature corresponding to a minimum value of the set of features. Herein, a first new column may be added to include the maximum value. Further, a second new column may be added to include the minimum value. Details related to the update of the aggregate table are further provided, for example, in FIG. 3A (At 314).

The set of operations may further include repeating the execution of the set of operations on other linked tables (for example, the linked table 114B) of the set of linked tables 114 to obtain the updated aggregate table. Details related to the repetition of the set of operations are further provided, for example, in FIG. 3A (At 316).

The electronic device 102 may train the ML model 102A based on the updated aggregate table. As an example, the ML model 102A may be a classification model that may be trained on the updated aggregate table. In order to avoid feature explosions, one or more features may be selectively removed. Details related to the training of the ML model 102A and the removal of the features are further provided, for example, in FIG. 3B.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 106. In addition, in some embodiments, the functionality of each of the database 106 and the server 104 may be incorporated into the electronic device 102, without a deviation from the scope of the disclosure.

Figure 2:
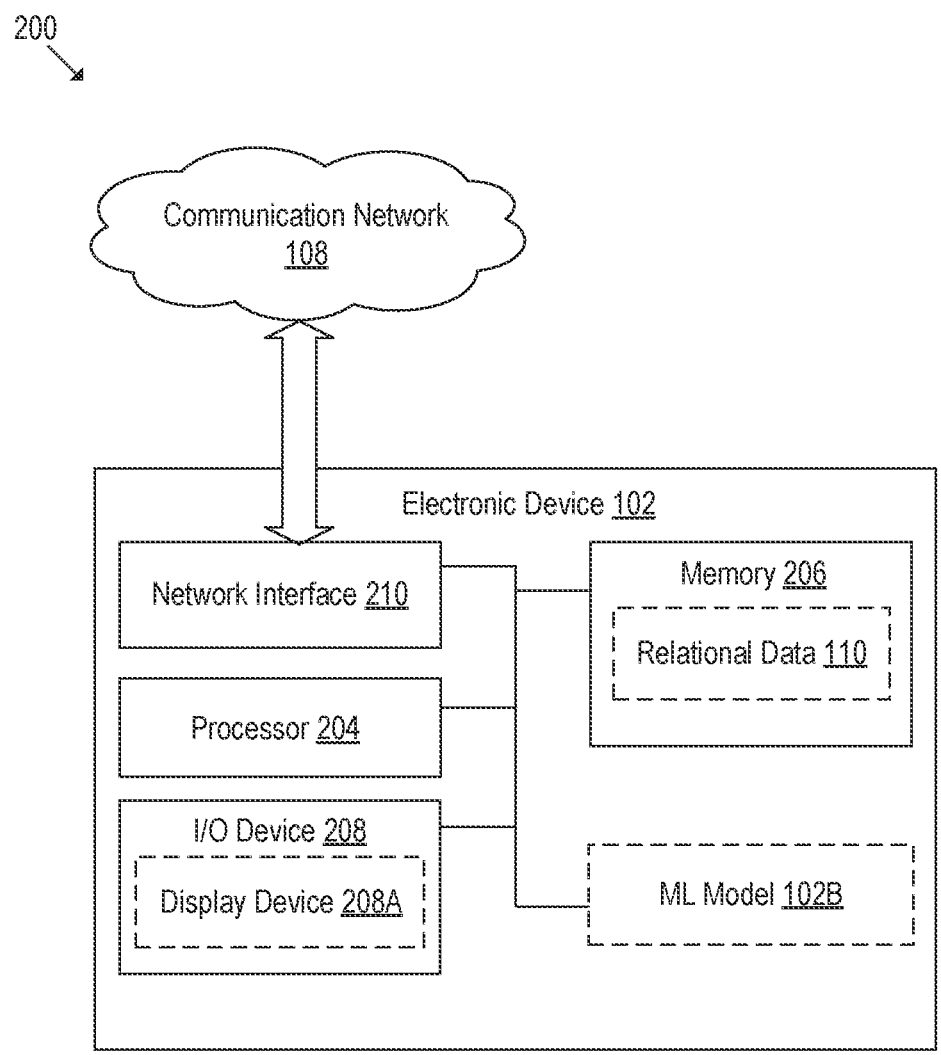
FIG. 2 is a block diagram that illustrates an exemplary electronic device for data type-based aggregation of multiple linked tables for machine learning tasks.

FIG. 2 is a block diagram that illustrates an exemplary electronic device for data type-based aggregation of multiple linked tables for machine learning tasks, in accordance with at least one embodiment described in the present disclosure. FIG. 2 is explained in conjunction with elements from FIG. 1. With reference to FIG. 2, there is shown a block diagram 200 of a system 202 that includes the electronic device 102. The electronic device 102 may include a processor 204, a memory 206, an input/output (I/O) device 208 (including, a display device 208A), and a network interface 210. In at least one embodiment, the memory 206 may store the relational data 110.

The processor 204 may include suitable logic, circuitry, and interfaces that may be configured to execute a set of instructions stored in the memory 206. The processor 204 may be configured to execute program instructions associated with different operations to be executed by the electronic device 102. For example, some of the operations may include relational data reception, linked table selection, data type determination, transformations determination, features determination, and aggregate features generation. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206. After the program instructions are loaded into the memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 that may be configured to store the relational data 110. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from the user 116 and provide an output based on the received input. The I/O device 208 which may include various input and output devices, may be configured to communicate with the processor 204. Examples of the I/O device 208 may include, but are not limited to, a touch screen, a keyboard, a mouse, a joystick, a microphone, a display device (e.g., the display device 208A), and a speaker.

The display device 208A may include suitable logic, circuitry, and interfaces that may be configured to display the information associated with the updated aggregate table. The display device 208A may be a touch screen which may enable a user to provide a user-input via the display device 208A. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The network interface 210 may include suitable logic, circuitry, and interfaces that may be configured to facilitate communication between the processor 204, the server 104, and a device hosting the database 106 (and/or any other device in the environment 100), via the communication network 108. The network interface 210 may be implemented by use of various known technologies to support wired or wireless communication of the electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), a satellite network, and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3A:
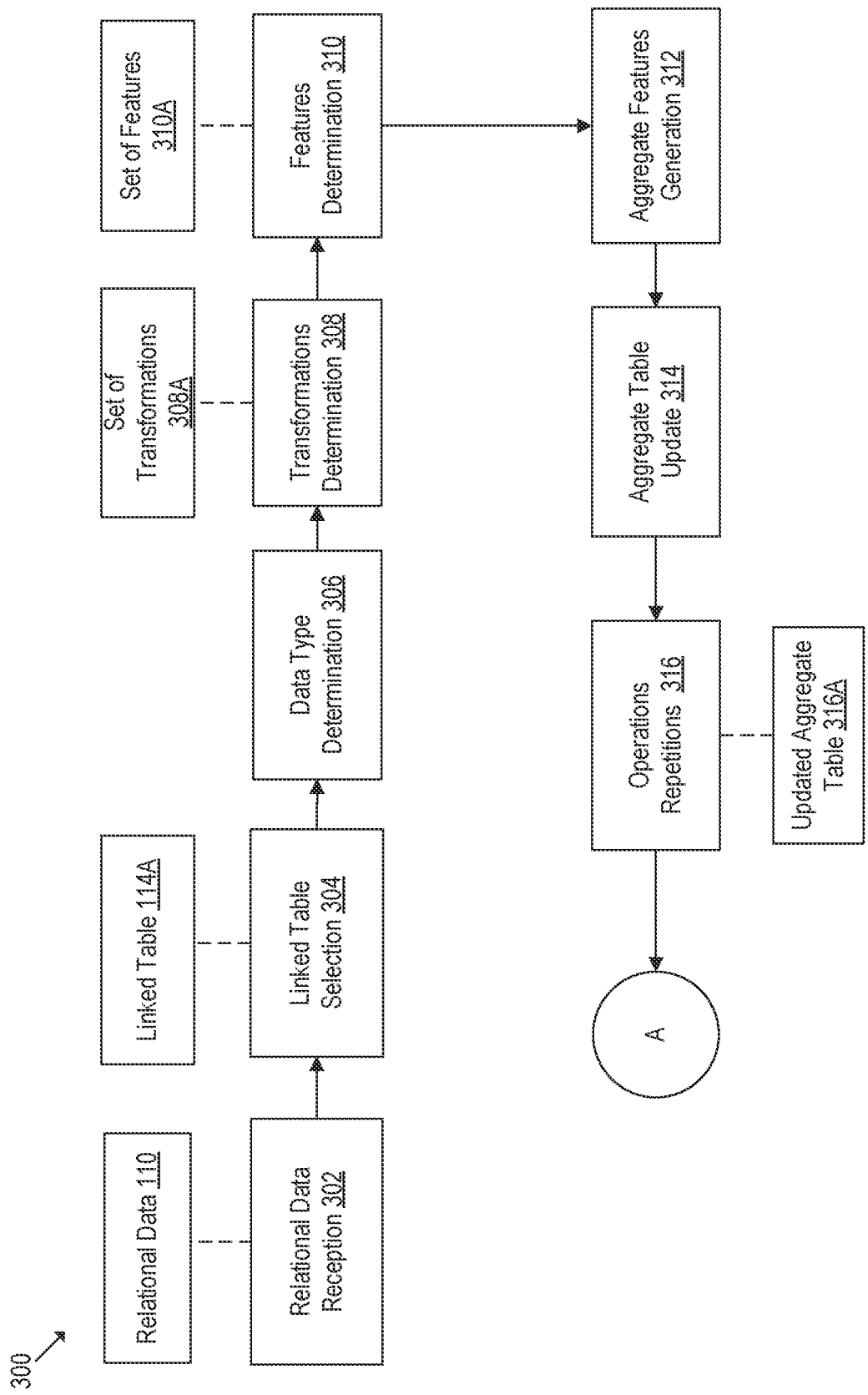
FIGS. 3A and 3B are diagrams that illustrates an execution pipeline for data type-based aggregation of multiple linked tables for machine learning tasks.
Figure 3B:
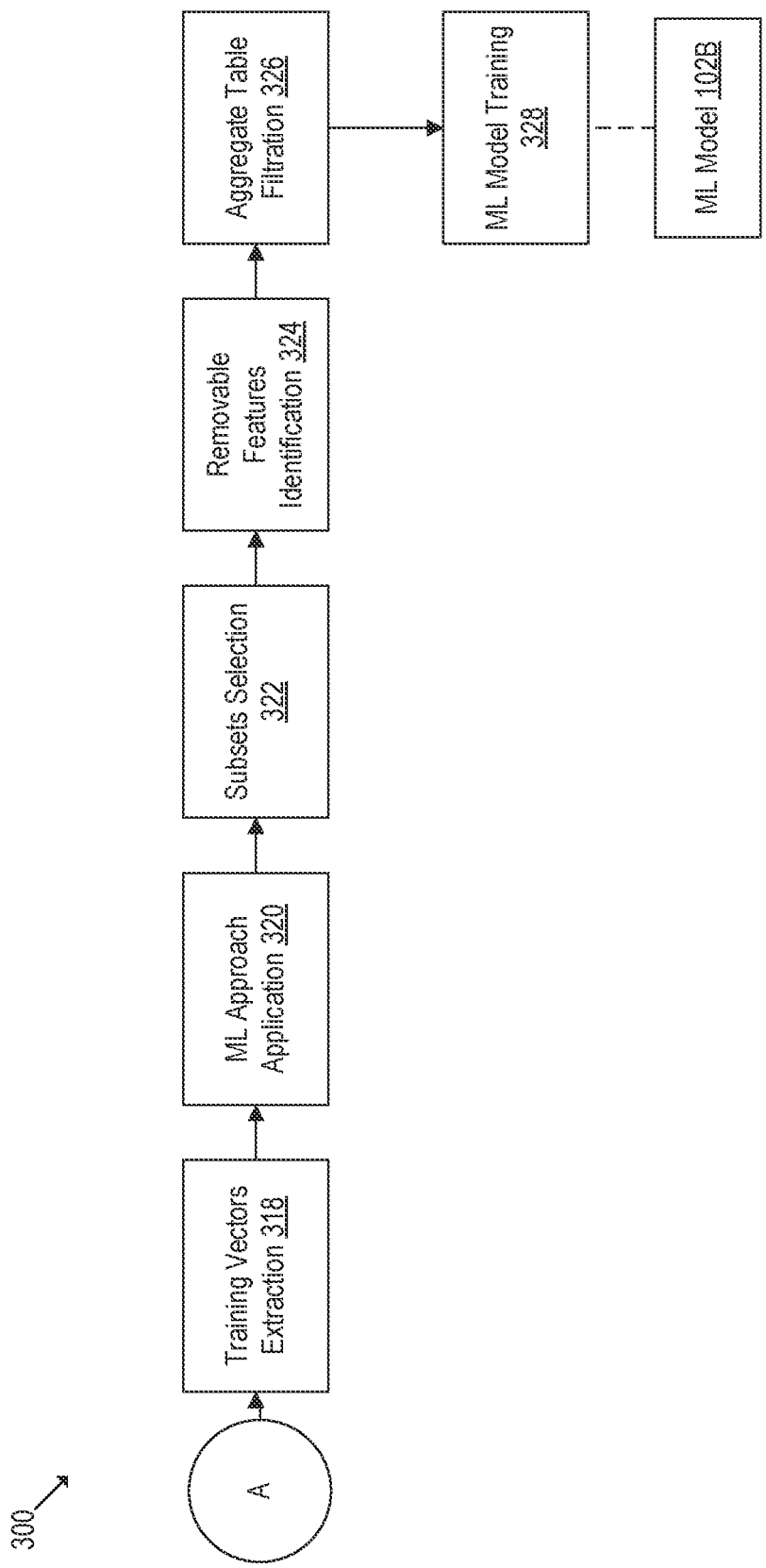

FIGS. 3A and 3B are diagrams that illustrates an execution pipeline for data type-based aggregation of multiple linked tables for machine learning tasks, in accordance with an embodiment of the disclosure. FIGS. 3A and 3B are described in conjunction with elements from FIG. 1 and FIG. 2. With reference to FIGS. 3A and 3B, there is shown an execution pipeline 300. The exemplary execution pipeline 300 may include a set of operations that may be executed by one or more components of FIG. 1, such as the electronic device 102. The operations may include a relational data reception operation 302, a linked table selection operation 304, a data type determination operation 306, a transformations determination operation 308, a features determination operation 310, an aggregate features generation operation 312, an aggregate table update operation 314, an operation repetition 316, training vectors extraction operation 318, a ML approach application operation 320, a subset selection operation 322, a removable features identification operation 324, an aggregate table filtration operation 326, and a ML model training operation 328. The set of operations may be performed by the electronic device 102 for a data type-based aggregation of multiple linked tables for machine learning tasks, as described herein. In FIGS. 3A and 3B, there is further shown the relational data 110, the linked table 114A, a set of transformations 308A, an updated aggregate table 316A, and the ML model 102A.

At 302, an operation for the relational data reception may be executed. In an embodiment, the processor 204 may be configured to receive the relational data 110 that may include the parent table 112 and the set of linked tables 114 associated with the parent table 112. The parent table 112 may be a base table. The parent table 112 and each linked table may include values that may be linked with one or more other tables of the set of linked tables 114. As an example, the relational data 110 may include the parent table 112 and the linked table 114A. The parent table 112 may be a customer information table. Each record may include a customer identification (ID), a customer name, a customer shipping address, a customer billing address, and a customer phone number. The linked table 114A may be a customer order table. Each record of the linked table 114A may include a customer ID, a product ID, a quantity, a product color, and a product size. The parent table 112 and the linked table 114A may have a common column associated with the customer ID. Thus, a relationship may exist between the parent table 112 and the linked table 114A.

At 304, an operation of linked table selection may be executed. In an embodiment, the processor 204 may be configured to execute a set of operations. The set of operations may include selecting a linked table from the set of linked tables 114. In an embodiment, the linked table may be selected from the set of linked tables 114 randomly. In another embodiment, the linked table may be selected iteratively. As an example, the processor 204 may select the linked table 114A.

At 306, an operation of data type determination may be executed. In an embodiment, the processor 204 may be configured to determine the data type that may be associated with each column of the selected linked table (for example, the linked table 114A). It may be appreciated that the selected linked table (for example, the linked table 114A) may include a plurality of columns. For example, the plurality of columns may include a column for customer IDs, a column for customer ages, a column for customer orders, a column for customer addresses, and the like. The data type that may be associated with a column of the plurality of columns may be same as or different from that of other columns.

In an embodiment, the determined data type may be at least one of a numeric data type, a date-time data type, a vector data type, or a categorical data type. In case the data type associated with a column is a numeric data type, then the corresponding column may include numeric values as features. In case the data type associated with a column is the date-time data type, then the corresponding column may include date-time values as features. In case the data type associated with a column is the vector data type, then the corresponding column may include vectors (e.g., vector embedding) as features. In case the data type associated with a column is the categorical data type, then the corresponding column may include categorical values (e.g., gender, payment type, etc.) as features.

In an example embodiment, the plurality of columns of the selected linked table (for example, the linked table 114A) may include a customer ID column, a product ID column, a dimension column, a date-time column. Herein, a feature of the customer ID column may be an alpha-numeric customer ID of a customer (for example, the user 116). A feature of the product ID column may be a numeric product ID of a product purchased by the customer A feature of the dimension column may correspond to dimensions (for example, a length, a breadth, and a width) of a product purchased by the customer. A feature of the date-time column may be a date value and a time value representing a date of purchase and a time of purchase of the product by the customer. Thus, the data type that may be associated with the customer ID column may be the categorical data type, the data type that may be associated with the product ID column may be the numeric data type. The data type that may be associated with the dimension column may be the vector data type. The data type that may be associated with the date-time column may be the date-time data type.

At 308, an operation of transformations determination may be executed. In an embodiment, the processor 204 may be configured to determine the set of transformations 308A based on the determined data type.

In an embodiment, each feature in the set of features for a first column of the selected linked table 114A may be of the vector data type. The set of transformations 308A may include a clustering of the set of features into a set of clusters using a clustering method. The set of clusters may be a set of groups or a set of labels into which the set of features for the first column may be grouped. The clustering method may be applied on the first column of the selected linked table 114A to determine the set of clusters. As an example, the clustering method may map the features of the set of features in the first column into "N" number of clusters.

In an embodiment, the clustering method may be a K-means clustering method. The K-means clustering method may be a vector optimization method that may group similar features of the set of features for the first column into a cluster. In other words, the K-means clustering method may partition the set of features for the first column into a "K" number of clusters in a manner that a sum of the squared distances between the features and their assigned cluster mean is minimized.

The set of transformations 308A may further include a selection of a cluster center for each feature of the set of features based on the set of clusters. The cluster center (also known as a centroid) may be a mean of a plurality of features assigned to the cluster. Further, the cluster center of a cluster may be a mean feature and may not necessarily belong to the set of features. The set of transformations 308A may further include a determination of a distance of each feature of the set of features to the selected cluster center. Upon determining the cluster center, the distance of each feature to the selected cluster center may be determined. Herein, the distance of each feature to the selected cluster center may be one of a Euclidean distance, a Manhattan Distance, a Jaccard Index, a Minkowski distance, and the like.

The set of transformations 308A may further include update of the selected linked table to include a first categorical column and a first numeric column. The first categorical column may be based on the cluster center for each feature of the set of features. The first numeric column may be based on the distance for each feature of the set of features.

In an embodiment, each feature in the set of features for a second column of the selected linked table may be of a date-time data type. Herein, the set of transformations 308A may include a selection of a first feature from the second column. The set of transformations 308A may further include a determination of a date-time difference of each feature of the set of features from the selected first feature. The set of transformations 308A may further include a determination of a periodic value of each feature of the set of features and update of the selected linked table (for example, the linked table 114A) to include a second numeric column (based on the determined date-time difference for each feature of the set of features), and a second categorical column (based on the determined periodic value of each of each feature of the set of features).

The first feature may be an earliest date-time value in the second column. As an example, values of the second column may be "$5^{th}$ February 1978", "$12^{th}$ March 1999", and "$30^{th}$ January 1989". Herein, the value "5$^{th}$ February 1978" may be an earliest date-time value. Hence, the first feature may be "5$^{th}$ February 1978". Upon selection of the first feature, the date-time difference of each feature from the selected first feature may be determined. That is, the date-time difference of the feature "12$^{th}$ March 1999" from the selected first feature "5$^{th}$ February 1978" may be determined as "21 years, 1 month, and 7 days". Similarly, the date-time difference of the feature "30$^{th}$ January 1989" from the selected first feature "5$^{th}$ February 1978" may be determined as "10 years, 1 month, and 12 days". Thereafter, the periodic value of each feature of the set of features may be determined. In an embodiment, the periodic value of each feature of the set of features may be one or more of a month of a year, a week of the year, a day of the week, and workhour. For example, the periodic value of the first feature "5$^{th}$ February 1978" may be "February" as the month, "6$^{th}$ Week" as the week, and "Sunday" as the day of the week. Similarly, the periodic value of the feature "12$^{th}$ March 1999" and the feature "30$^{th}$ January 1989" may be determined. Thereafter, the linked table 114A may be updated to include the second numeric column. The second numeric column may include the date-time difference for each feature of the set of features. That is, the second numeric column may include "0" for the selected first feature "5$^{th}$ February 1978", Further, the second numeric column may include "21 years, 1 month, and 7 days" for the feature "12$^{th}$ March 1999". Similarly, the second numeric column may include "10 years, 1 month, and 12 days" for the feature "30$^{th}$ January 1989". The linked table 114A may be further updated to include the second numeric column. The second categorical column may include the periodic value "February" as the month, "6$^{th}$ Week" as the week, and "Sunday" as the day of the week for the first feature "5$^{th}$ February 1978". Similarly, the second categorical column may include the periodic value of the feature "12$^{th}$ March 1999" and the feature "30$^{th}$ January 1989". The updated linked table 114A may, thus, include the second numeric column and the second categorical column instead of a date-time data type column.

In an embodiment, each feature in a set of features for a third column of the selected linked table may be of a categorical type. The set of transformations 308A may include application of one or more categorical feature aggregation operations that include one or more of a count aggregation function, a least common value function, a most common value function, and a ratio of values corresponding to the least common value function and the most common value function, a ratio of percentage values corresponding to the least common value function and the most common value function on the third column. The count aggregation function may determine a count of each feature in the set of features for the third column. The least common value function may determine the feature that may occur a minimum number of times in the set of features. The most common value function may determine the feature that may occur a maximum number of times in the set of features. As an example, the set of features for the third column may be "A, B, C, A, E, A, C, E". Herein, the count of the feature "A" may be "3", the count of the feature "B" may be "1", the count of the feature "C" may be "2", and the count of the feature "E" may be "2". An output of the least common function applied on the set of features for the third column may be "B". An output of the most common function applied on the set of features for the third column may be "A".

In an embodiment, each feature in a set of features for a third column of the selected linked table may be of a numeric type. In an embodiment, the set of transformations 308A may include applying one or more numeric feature aggregation operations that include one or more of the minimum value function, the maximum value function, an averaging function, or a summing function on the third column. The count aggregation function may determine a count of each feature in the set of features for the third column. The minimum value function may determine the feature having a minimum value in the set of features. The maximum value function may determine the feature having a maximum value in the set of features. The averaging function may determine an average of the set of features. The summing function may determine a sum of the set of features. As an example, the set of features for the third column may be "3.4, 6.7, 7.5, 2.1, 3.5, 3.9, 4.1, 5.2". Herein, output of the minimum value function, when applied on the set of features for the third column, may be "2.1". An output of the maximum value function, when applied on the set of features for the third column, may be "7.5". An output of the averaging function, when applied on the set of features for the third column, may be "4.55". An output of the summing function, when applied on the set of features for the third column, may be "36.4".

At 310, an operation of features determination may be executed. In an embodiment, the processor 204 may be configured to determine the set of features corresponding to each primary key in the parent table 112 from each column of the selected linked table (for example, the linked table 114A). The parent table 112 may include a primary key column that may include a set of primary keys. Each primary key may uniquely identify each row in the parent table 112. As an example, the primary key may be a customer ID, an order ID, a purchase number, a transaction type, and the like. A sub-table may be extracted from the selected linked table (for example, the linked table 114A) based on the primary key. The extracted sub-table may include the set of features corresponding to primary key from each column of the selected linked table. As an example, the primary key in the parent table 112 may be the customer ID as "ID-1". The sub-table may be extracted from the selected linked table (for example, the linked table 114A) based on the primary key "ID-1". Herein, one or more rows of the selected linked table (for example, the linked table 114A) corresponding to the primary key "ID-1" may be extracted to obtain the sub-table. Details related to the determination of the set of features corresponding to each primary key in the parent table 112 are further provided, for example, in FIG. 4.

At 312, an operation of features determination may be executed. In an embodiment, the processor 204 may be configured to generate one or more aggregate features corresponding to each primary key in the parent table 112 by applying the set of transformations 308A on the set of features. As an example, the set of transformations 308A may be one or more categorical feature aggregation operations. The one or more categorical feature aggregation operations may be applied on the set of features to generate the one or more aggregate features corresponding to each primary key. The one or more aggregate features may include, for example, the count of each feature, the feature having the minimum count, and the feature having the maximum count.

In another example, the set of transformations 308A may include one or more numeric feature aggregation operations. The one or more numeric feature aggregation operations may be applied on the set of features to generate the one or more aggregate features corresponding to each primary key. The one or more aggregate features may be the feature having the minimum value, the feature having the maximum value, the average of the set of features, and the sum of the set of features.

In an embodiment, the one or more aggregate features may be generated by applying one or more categorical feature aggregation operations on the first categorical column and applying one or more numeric feature aggregation operations on the first numeric column. In another embodiment, the one or more aggregate features may be generated by applying one or more categorical feature aggregation operations on the second categorical column; and applying one or more numeric feature aggregation operations on the second numeric column. In an example, the first categorical column may include "VAL_A, VAL_B, VAL_L, VAL_A, VAL_B, VAL_B, VAL_L, VAL_L, and VAL_L" Herein, the one or more categorical feature aggregation operations may be applied on the first categorical column to generate the one or more aggregate features. The generated one or more aggregate features may include the count of value of each feature ("2" for the feature "ID_A", "3" for the feature ID_B, "4" for the feature "ID_L", the feature having the minimum count as the feature "ID_A", and the feature having the maximum count as the feature "ID_L". In another example, the first numeric column may include "3.4, 4.3, 7.9, 6.5, 6.7, 7, 6.1, 7.3, and 8.1" The one or more numeric feature aggregation operations may be applied on the numeric categorical column to generate the one or more aggregate features. Herein, the generated one or more aggregate features may include a maximum of "8.1", a minimum of "3.4", an average of "6.37", and a summation as "57.3".

At 314, an operation of aggregate table update may be executed. In an embodiment, the processor 204 may be configured to update the aggregate table to include the one or more aggregate features under one or more new columns of the aggregate table. The updated aggregated table may include columns of the parent table 112 and the one or more aggregate features under one or more new columns. As an example, the parent table 112 may include a column corresponding to customer IDs, a column corresponding to object IDs, and a column corresponding to object sizes. A first new column corresponding to a first aggregate feature, a second new column corresponding to a second aggregate feature, and a third new column corresponding to a third aggregate feature may be added into the parent 112 to obtain the updated aggregate table.

At 316, an operation of aggregate table update may be executed. In an embodiment, the processor 204 may be configured to repeat the execution of the set of operations on other linked tables of the set of tables 114 to obtain the updated aggregate table 316A. Once the set of operations is executed on the linked table 114A, the set of operations may be executed on another linked table, for example, the linked table 114B. The execution of the set of operations may be repeated for other linked tables of the set of tables 114 to obtain the updated aggregate table 316A.

At 318, an operation of training vectors extraction may be executed. In an embodiment, the processor 204 may be configured to extract N-subsets of training vectors by sampling rows of the updated aggregate table 316A. The updated aggregate table 316A may be a table of training vectors. It should be noted that each row of the updated aggregate table 316A may correspond to a training vector. The N-subsets of training vectors may be extracted from the updated aggregate table 316A. The extracted N-subsets of training vectors may be non-overlapping vectors. Further, a size of each subset of the N-subsets of training vectors may be same. As an example, the updated aggregate table 316A may include "100" rows and "1225" columns. Thus, a total number of training vectors may be "100". The "100" number of rows may be sampled into 10-subsets of training vectors, in which each subset may include "10" rows.

At 320, an operation of ML application may be executed. In an embodiment, the processor 204 may be configured to apply a machine learning approach on the N-subsets of training vectors to determine a cross-validation result for each of the N-subsets of training vectors. In an embodiment, the machine learning approach may be a wide learning approach that may be applied to each training vector of the N-subsets of training vectors. The wide learning approach may be similar to a "discovery" process in science. In the discovery process, initially a hypothesis is proposed. Thereafter, data that verify a validity of the hypothesis may be collected based on experimentations. If the hypothesis is validated, then the hypothesis is considered as a discovery. If the hypothesis is unvalidated, then a new hypothesis is proposed. Similarly, the wide learning approach may treat various combinations of datasets as hypotheses. Thereafter, each dataset may be validated one by one. As an example, each subset of the N-subsets of training vectors may include "500" number of training vectors. Further, each subset may be non-overlapping and may include distinct training vectors. A K-fold cross-validation approach may be applied on each of the N-subsets of training vectors. For a subset, in a first iteration, a first training vector out of the "500" number of training vectors included in the corresponding subset, may be chosen as test data. The other "500" number of training vectors may be chosen as training data. A machine learning (ML) model may be trained on the other "500" number of training vectors. Thereafter, the ML model may be tested on the first training vector. At a second iteration, a second training vector out of the "500" number of training vectors included in the corresponding subset, may be chosen as the test data. The ML model may be trained on the other "500" number of training vectors. Thereafter, the ML model may be tested on the second training vector. The process may be repeated for all other training vectors of the 500" number of training vectors. Thereafter, the cross-validation result may be obtained. The cross-validation result may determine a best combination of the test data and the training data from the "500" number of training vectors for the subset.

At 322, an operation of subsets selection may be executed. In an embodiment, the processor 204 may be configured to select subsets from the N-subsets of training vectors based on an accuracy score associated with the subset. An accuracy associated with the subset may be based on the cross-validation result. As an example, the machine learning model may be a prediction model. The accuracy score associated with the subset may be a prediction score. The accuracy score associated with each subset of the N-subsets of training vectors may be determined. Thereafter, the accuracy score associated with each subset may be compared with a threshold accuracy score. In case the accuracy score associated with a subset is greater than the threshold accuracy score, then the corresponding subset may be selected. As an example, "M" number of subsets having associated with top "M" accuracy scores may be selected from the N-subsets of training vectors.

At 324, an operation of removable features identification may be executed. In an embodiment, the processor 204 may be configured to identify removable columns from the selected subsets based on a correlation between columns in the selected subsets. As an example, each subset of the selected subsets may include "L" number of columns. Each column of the "L" number of features columns may be correlated with the other columns of the L" number of features columns. The columns for which a correlation result may be greater than a threshold correlation result may be rejected.

At 326, an operation of aggregate table filtration may be executed. In an embodiment, the processor 204 may be configured to filter the aggregate table 316A based on the removable columns. As an example, a first column, a second column, a third column, a fourth column, and a firth column may be correlated with each other. Hence, only the first column may be retained. The second column, the third column, the fourth column, and the firth column may be rejected. Therefore, the aggregate table 316A may be filtered such that the second column, the third column, the fourth column, and the firth column are removed from the filtered aggregate table.

At 328, an operation of ML model training may be executed. In an embodiment, the processor 204 may be configured to train the ML model 102A based on the updated aggregate table 316A. The training vectors of the updated aggregate table 316A may be used for training of the ML model 102A. In an embodiment, the ML model 102A may be trained based on the training vectors in the filtered aggregate table 316A. The usage of the filtered aggregate table 316A may ensure that the trained ML model 102A is accurate.

In an embodiment, the training may include using an automated machine learning method to iteratively train a candidate machine learning model while selectively removing columns of the filtered aggregate table after each training checkpoint. The candidate machine learning model may be the trained machine learning model when an accuracy score associated with the candidate machine learning model is above the threshold. As an example, "SapientML" method may be used to iteratively train the candidate machine learning model. After each iteration, the accuracy score associated with the trained candidate machine learning model may be compared with the threshold. In case the accuracy score associated with the trained candidate machine learning model is lesser than the threshold, then the trained candidate machine learning model of a previous iteration may be saved. However, in case the accuracy score associated with the trained candidate machine learning model is greater than the threshold, then non-contributing columns associated with the trained candidate machine learning model may be removed from the filtered aggregate table. Thereafter, the candidate machine learning model may be re-trained based on the removal of the non-contributing columns from the filtered aggregate table. Details related to the training of the candidate machine learning model are further provided, for example, in FIG. 7.

The electronic device 102 may thus facilitate data type-based aggregation of multiple linked tables for machine learning tasks. The electronic device 102 may allow usage of information from the set of linked tables 114 in a tabular format. Further, the electronic device 102 may aggregate the columns of different data types in the set of linked tables 114 and may mitigate an effect of column explosive caused by deeply linked tables and multitude of aggregation functions.

In an example embodiment, the disclosed electronic device 102 may be used for fraud detection and in scenarios where the set of linked tables 114 may include separate tables for card holders, credit cards, point-of-sales, and companies. The parent table 112 may include ownership information, transaction information, and the like Further, the set of linked tables 114 may be linked based on ownership information, transaction information, and the like. Herein, each table of the parent table 112 and the set of linked tables 114 may need to be analyzed for fraud detections. Analyzing each table may be a complex, tedious, and time-consuming task. In such situations, the updated aggregate table 316A may be used for the fraud detections.

In another example embodiment, the disclosed electronic device 102 may be used for detection of tax evasion. The parent table 112 may include information associated with a financial payment made by a company, a business relationship of one company to another company, a business relationship of one company to an individual, and the like. The set of linked tables 114 may include separate tables for companies, individuals, such as, attorneys, accountants, and the like. Entries in the set of linked tables 114 may be linked based on financial payments, business relationships, and the like. The determination of whether a company or an individual may be engaged in tax evasion may be complex. In such situations, the updated aggregate table 316A may be used for detection of the tax evasion.

The disclosed electronic device 102 may be also used for product recommendation tasks where the parent table 112 and the set of linked tables 114 may include separate tables for customers, articles, and transaction information. The parent table 112 and the set of linked tables 114 may be linked based on transactions made, articles purchased by customers, and the like. Herein, based on the updated aggregate table 316A, the ML model 102A may be trained for making article recommendations to a customer. In an example, the parent table 112 may include information associated with customer IDs. The set of linked tables 114 may include separate tables for transactions information, articles information, and the like. The linked table 114A may be a transactions table. The linked table 114B may be an articles table. Each customer ID entry may be linked to multiple transaction entries. Each transaction entry may be linked to one or more article entries. The columns of the parent table 112 may be retained as it is in the updated aggregate table 316A. Thereafter, the parent table 112 and the linked table 114A may be joined based on the links associated with the customer IDs based on the application of the set of transformations. The parent table 112 and the linked table 114B may be joined based on article IDs to update the aggregate table 316A. The updated aggregate table 316A may be filtered based on the determine contributing features. For example, a column associated with customer ages may be removed. The automatic machine learning approach may be then applied on the filtered aggregate table 316A to identify best feature set and best trained machine learning model such as, a "Random Forest" model.

Figure 4:
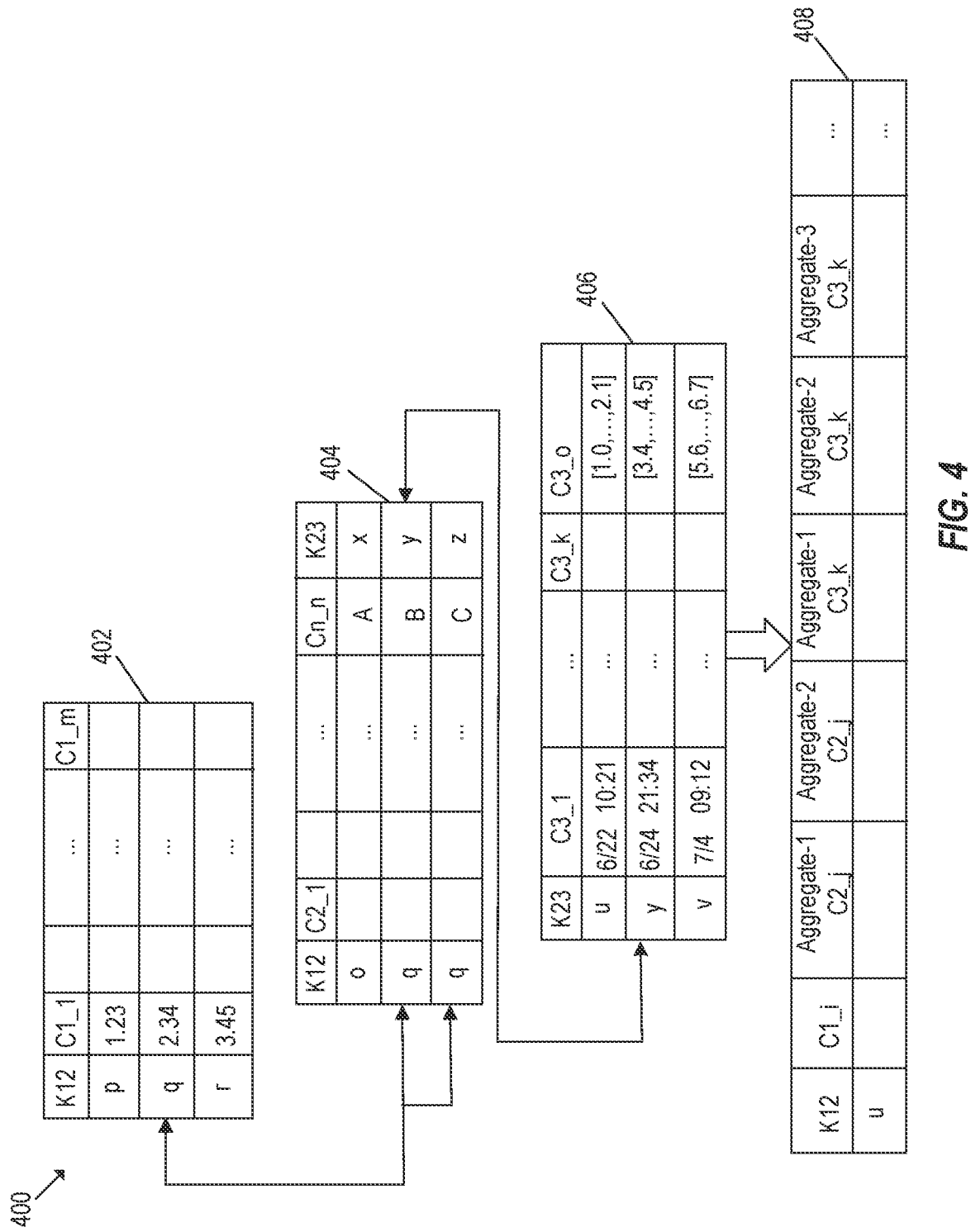
FIG. 4 is a diagram that illustrates an exemplary scenario for updating an aggregate table.

FIG. 4 is a diagram that illustrates an exemplary scenario for updating an aggregate table, in accordance with at least one embodiment described in the present disclosure. FIG. 4 is described in conjunction with elements from FIG. 1, FIG. 2, FIG. 3A, and FIG. 3B. With reference to FIG. 4, there is shown an exemplary scenario 400. The exemplary scenario 400 may include a parent table 402, a linked table 404, a linked 406, and an updated aggregate table 408. A set of operations associated with the scenario 400 is described herein.

With reference to the scenario 400, the parent table 402 may include a primary key column "K12" and columns from "C1_1" to "C1_m". The primary key column "K12" may include primary keys denoted as "p", "q", and "r". The column "C1_1" may include features of the numeric data type. The column "C1_1" may include "1.23", "2.34", and "3.45". The linked table 404 may include a primary key column "K12", a primary key column "K23", and columns from "C2_1" to "C2_n". The primary key column "K12" may include primary keys, such as "o", "q", and "q". The primary key column "K23" may include primary keys, such as "x", "y", and "z". The column "C2_n" may include features of the categorical data type. The column "C2_n" may include "A", "B", and "C".

The primary key "q" of the primary key column "K12" of the parent table 402 may be linked to two primary keys "q" of the primary key column "K12" of the linked table 404. The primary key column "K12" and the columns of the parent table 402 may be retained as it is in the aggregate table 408. Thereafter, the processor 204 may determine a set of features corresponding to the primary key "q" from each column of the linked table 404. Herein, a sub-table may be extracted from the linked table 404 by extracting features corresponding to the primary key "q" from the columns from "C2_1" to "C2_n". The processor 204 may generate one or more aggregate features corresponding to the primary key "q" in the parent table 402 by applying the set of transformations on the set of values. The aggregate table 408 may be updated to include the one or more aggregate features under one or more new columns of the aggregate table 408. For each column (for example, the column "C2_n") of the linked table 404 one or more aggregate features may be generated.

The linked table 406 may include a primary key column "K23", a column "C3_o", and columns from "C2_1" to "C2_k". The primary key column "K12" may include primary keys, such as "u", "y", and "v". The column "C3_1" may include features of the date-time data type. The column "C2_1" may include a feature "6/22 10:21", a feature "6/24 21:34", and a feature "7/4 09:12". The column "C2_0" may include a feature "[1.0, . . . , 2.1]", a feature "[3.4, . . . , 4.5]", and a feature "[5.6, . . . , 6.7]".

The primary key "y" of the primary key column "K23" of the linked table 404 may be linked to the primary key "y" of the primary key column "K23" of the linked table 406. The processor 204 may determine a set of features corresponding to the primary key "y" from each column of the linked table 406. Herein, a sub-table may be extracted from the linked table 406 by extracting features corresponding to the primary key "y" from the columns from "C3_1" to "C3_k" and "C3_o". Thereafter, the processor 204 may generate one or more aggregate features corresponding to the primary key "y" in the parent table 402 by applying the set of transformations on the set of features. The aggregate table 408 may be updated to include the one or more aggregate features under one or more new columns of the aggregate table 408. For each column (for example, the column "C3_k") of the linked table 406 one or more aggregate features may be generated. One or more new columns may be an aggregate-1 (C3_k), an aggretegate-2 (C3_k), and an aggregate-3 (C3_k). A number of columns in the updated aggregate table 408 can be more than a number of columns in the parent table 402, a number of columns in the linked table 404, and a number of columns in the linked table 406.

It should be noted that the scenario 400 of FIG. 4 is merely an example and such an example should not be construed as limiting the scope of disclosure.

Figure 5:
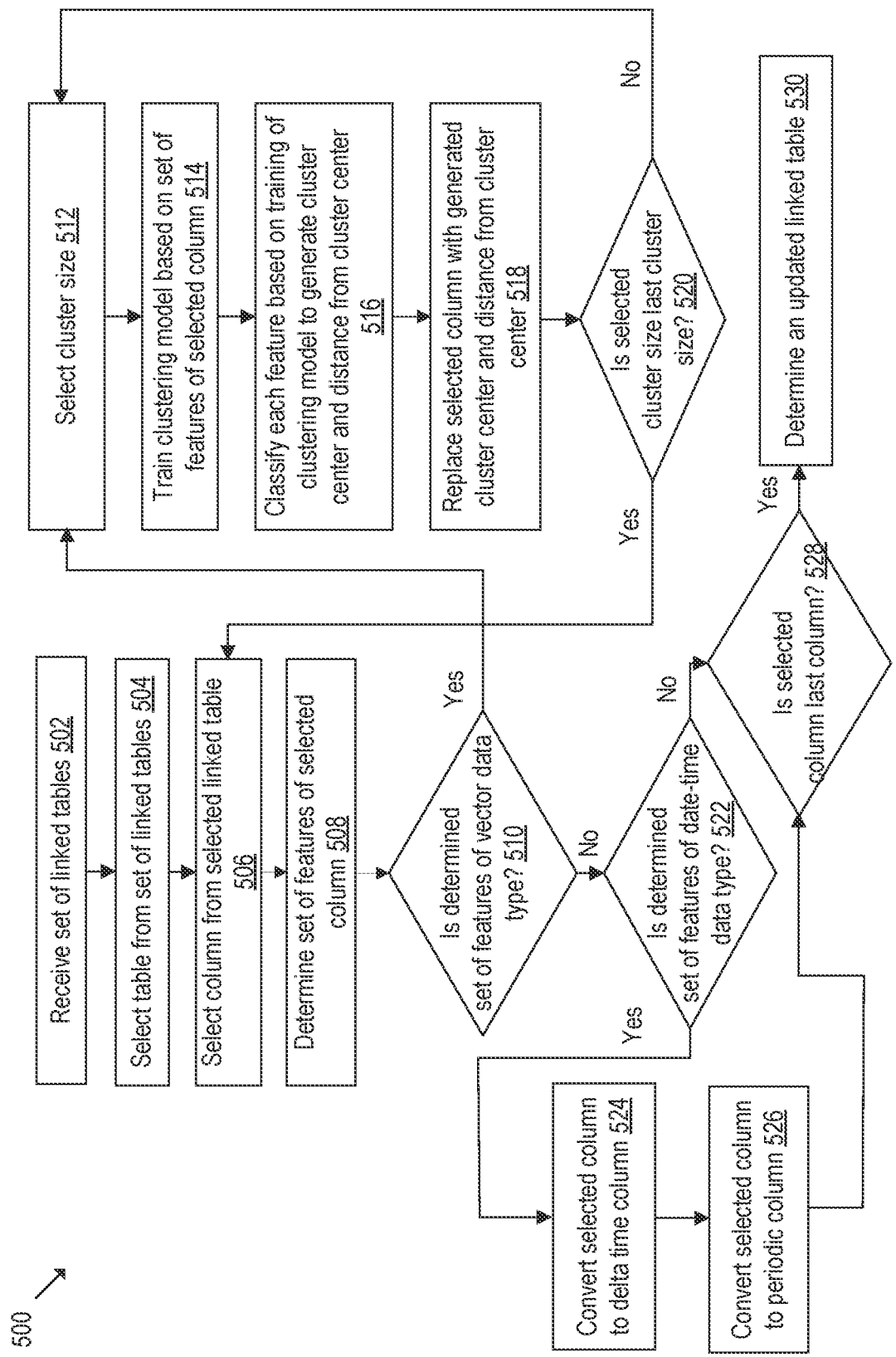
FIG. 5 is a diagram that illustrates a flowchart of an example method for converting columns of date-time data types and/or vector data types to columns of categorical data types or numeric data types.

FIG. 5 is a diagram that illustrates a flowchart of an example method for converting columns of date-time data types and/or vector data types to columns of categorical data types or numeric data types, in accordance with an embodiment of the disclosure. FIG. 5 is described in conjunction with elements from FIG. 1, FIG. 2, FIG. 3A, FIG. 3B, and FIG. 4. With reference to FIG. 5, there is shown a flowchart 500. The method illustrated in the flowchart 500 may start at 502 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, the set of linked tables 114 may be received. In an embodiment, the processor 204 may be configured to receive the set of linked tables 114. Details related to the reception of the set of linked tables 114 are further provided, for example, in FIG. 3A (at 302).

At block 504, the linked table 114A may be selected. In an embodiment, the processor 204 may be configured to select the linked table 114A from the set of linked tables 114. Details related to the selection of the linked table 114A are further provided, for example, in FIG. 3A (at 304).

At block 506, a column may be selected from the selected linked table 114A. In an embodiment, the processor 204 may be configured to select the column from the selected linked table 114A. The selected linked table 114A may include a plurality of columns and one or more primary keys column. The column may be selected from the plurality of columns one by one. In an example, the linked table 404 may be selected. Thereafter, the column "C2_1" may be selected.

At block 508, a set of features of the selected column may be determined. In an embodiment, the processor 204 may be configured to determine the set of features of the selected column of the selected linked table 114A. In an example, the selected column may correspond to a dimension of an ordered object. Herein, the selected column may include a length, a breadth, a width of an object "P", a length, a breadth, a width of an object "Q", and a length, a breadth, a width of an object "R".

At block 510, it may be determined whether each feature in the determined set of features of the selected column of the selected linked table 114A is of the vector data type. In an embodiment, the processor 204 may be configured to determine whether each feature in the determined set of features of the selected column of the selected linked table 114A is of the vector data type. In an example, the linked table 406 may be selected. Further, the column "C3_0" of the selected linked table 406 may be selected. Herein, the feature "[1.0, . . . , 2.1]", the feature "[3.4, . . . , 4.5]", and the feature "[5.6, . . . , 6.7]" of the column "C3_o" may be of the vector data type. In case each feature of the set of features is of the of the vector data type, then the flowchart 500 may move to a block 512.

At block 512, a cluster size may be selected. In an embodiment, the processor 204 may be configured to select the cluster size. As an example, the cluster size may be a number of features "X" of the selected column. As another example, the cluster size may be "1.5" times of the number of features "X" of the selected column. In another example, the cluster size may be twice the number of features "X" of the selected column.

At block 514, a clustering model may be trained on the determined set of features of the selected column. In an embodiment, the processor 204 may be configured to train the clustering model on the determined set of features of the selected column. Each feature of the determined set of features may be of the vector data type. The clustering model may learn each feature of the determined set of features.

At block 516, each feature of the determined set of features may be classified based on the training of the clustering model to generate a cluster center and a distance of the feature from the generated cluster center. In an embodiment, the processor 204 may be configured to classify each feature of the determined set of features based on the training of the clustering model to generate the cluster center for each feature of the set of features based on the set of clusters and the distance of each feature of the set of features to the generated cluster center.

Upon classification, at 518, the selected column may be replaced with the generated cluster center and the distance from the generated cluster center. In an embodiment, the processor 204 may be configured to replace the selected column with the generated cluster center and the distance from the generated cluster center. The selected linked table 114A may be updated to include the first categorical column based on the cluster center for each feature of the set of features and the first numeric column based on the distance for each feature of the set of features. For example, the column "C3_o" of the linked table 404 may be replaced by the first categorical column and the first numeric column.

At 520, it may be determined whether the selected cluster size is a last cluster size. In an embodiment, the processor 204 may be configured to determine whether the selected cluster size is a last cluster size. In an example, the cluster sizes may be "X", "0.5X", "1.5X", and "2X". It may be possible that the set of features may naturally cluster into fewer or a greater number of clusters than a number of distinct features in the set features. Therefore, processes of the blocks 512 to 518 may be repeated with each cluster size. In case the selected cluster size is not the last cluster size, then the flowchart 500 may move to the block 512 and the processes of the blocks 512 to 518 may be repeated. In case the selected cluster size is the last cluster size, then the flowchart 500 may move to the block 506 and the process of the blocks 506 to 510 may be repeated.

The processor 204 may re-select the column of the selected linked table 114A. Thereafter, the processor 204 may determine whether each feature in the determined set of features of the selected column of the selected linked table 114A is of the vector data type. In case the determined set of features of the selected column is not of the vector data type, the flowchart 500 may move to block 522.

At block 522, it may be determined whether each feature in the determined set of features of the selected column of the selected linked table 114A is of the date-time data type. In an embodiment, the processor 204 may determine whether each feature in the determined set of features of the selected column of the selected linked table 114A is of the date-time data type. In an example, the selected linked table may be the linked table 406. The column "C3_1" of the linked table 406 may be selected. The column "C3_1" may the features of the date-time data type. The column "C2_1" may include the feature "6/22 10:21", the feature "6/24 21:34", and the feature "7/4 09:12". In case each feature in the determined set of features of the selected column is of the date-time data type, then the flowchart 500 may move to block 524. In case each feature in the determined set of features of the selected column is not of the date-time data type, then the flowchart 500 may move to block 528.

At block 524, the selected column may be converted to a delta time column. In an embodiment, the processor 204 may convert the selected column to the delta time column. Herein, the first feature corresponding to an earliest date-time value may be selected. Thereafter, the delta time of each feature of the set of features from the selected first feature may be determined. Herein, the delta time of each feature of the set of features may be the date-time difference of the corresponding feature from the selected first feature. Thereafter, the selected linked table114A may be updated to include the second numeric column based on the determined date-time difference for each feature of the set of features.

At block 526, the selected column may be converted to a periodic column. In an embodiment, the processor 204 may be configured to convert the selected column to the periodic column. Herein, the periodic value such as, the month, the week, the day of the week, and the workhour of each feature of the set of features may be determined. Thereafter, the selected linked table 114A may be updated to include the second categorical column based on the determined periodic value for each feature of the set of features.

At block 528, it may be determined whether the selected column is a last column. In an embodiment, the processor 204 may be configured to determine whether the selected column is the last column of the selected linked table 114A. In case the selected column is not the last column of the selected linked table 114A, then the flowchart 500 may move to the block 504. In case the selected column is the last column of the selected linked table 114A, then the flowchart 500 may move to block 530.

At block 530, the updated linked table 114A may be determined. In an embodiment, the processor 204 may be configured to determine the update linked table 114A.

Although the flowchart 500 is illustrated as discrete operations, such as 502, 504, 506, 508, 510, 512, 514, 516, 518, 520, 522, 524, 526, 528, and 530. However, in certain embodiments, such discrete operations may be further divided into additional operations, combined into fewer operations, or eliminated, depending on the particular implementation without detracting from the essence of the disclosed embodiments.

Figure 6:
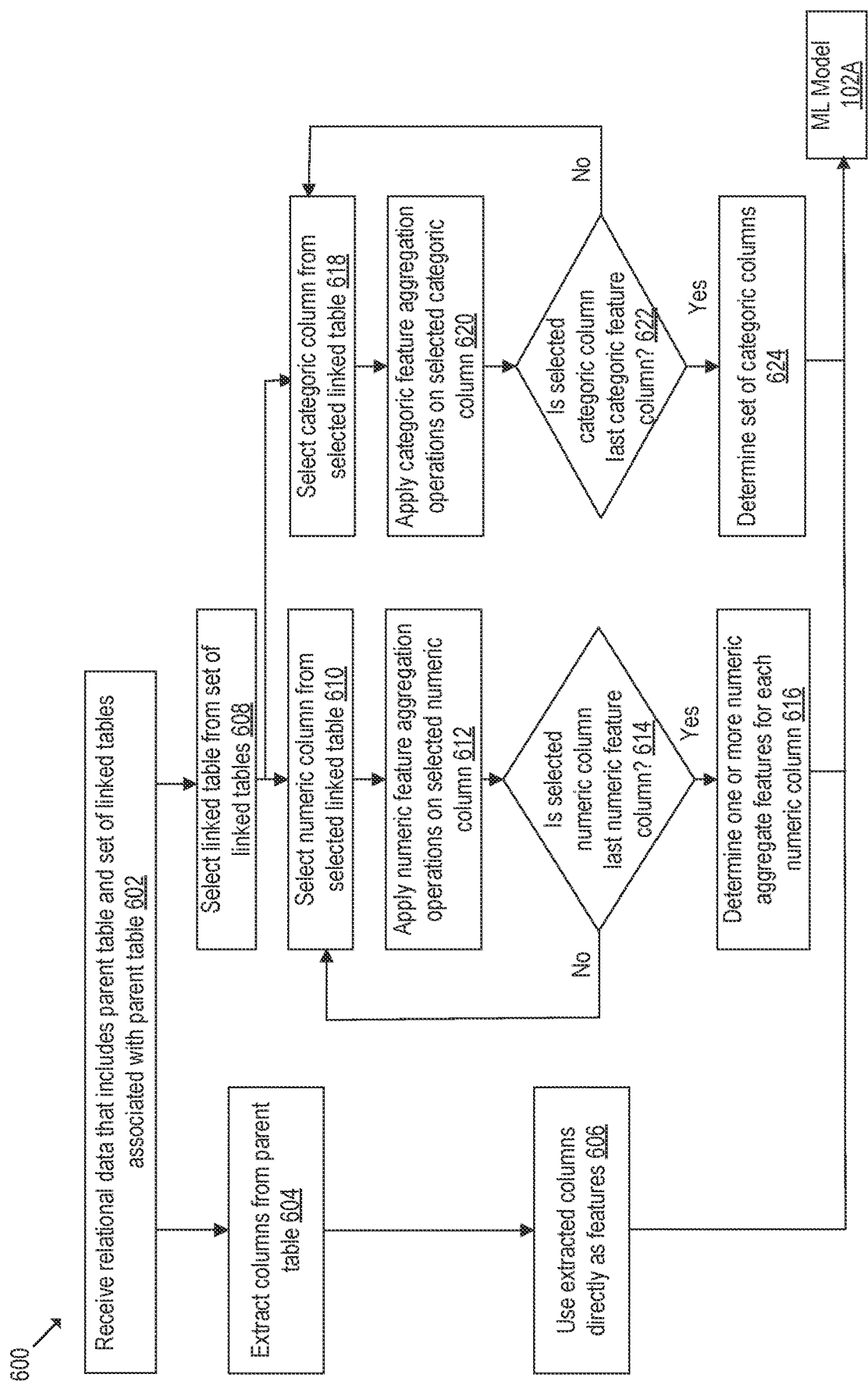
FIG. 6 is a diagram that illustrates a flowchart of an example method for updating an aggregate table.

FIG. 6 is a diagram that illustrates a flowchart of an example method for updating an aggregate table, in accordance with an embodiment of the disclosure. FIG. 6 is described in conjunction with elements from FIG. 1, FIG. 2, FIG. 3A, FIG. 3B, FIG. 4, and FIG. 5. With reference to FIG. 6, there is shown a flowchart 600. The method illustrated in the flowchart 600 may start at 602 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, the relational data 110 that may include the parent table 112 and the set of linked tables 114 associated with the parent table 112 may be received. In an embodiment, the processor 204 may be configured to receive the relational data 110 that may include the parent table 112 and the set of linked tables 114 associated with the parent table 112. Details related to the reception of the relational data 110 are further provided, for example, in FIG. 3A (at 302).

At block 604, columns may be extracted from the parent table 112. In an embodiment, the processor 204 may be configured to extract the columns from the parent table 112. Herein, each of a one or more key columns and one or more columns of the parent table 112 may be extracted. For example, the primary key column "K12" and the columns from "C1_1" to "C1_m" of the parent table 402 may be extracted.

At block 606, the extracted columns may be directly used as features. In an embodiment, the processor 204 may be configured to use the extracted columns directly as the features. Herein, the extracted columns of the parent table 402 may be placed as it is in the aggregate table 408.

At block 608, a linked table (for example, the linked table 114A) may be selected from the set of linked tables 114. In an embodiment, the processor 204 may be configured to select the linked table 114A from the set of linked tables 114. Details related to the selection of the linked table 114A are further provided, for example, in FIG. 3A (at 306).

At block 610, a numeric column may be selected from the selected linked table 114A. In an embodiment, the processor 204 may be configured to select the numeric column from the selected linked table 114A. Herein, the numeric column may be a column that may include features of the numeric data type. In an example, the selected numeric column may include numeric features corresponding to a selling price of items.

At block 612, the one or more numeric feature aggregation operations may be applied on the selected numeric column. In an embodiment, the processor 204 may be configured to apply the one or more numeric feature aggregation operations on the selected numeric column. In an example, the one or more numeric feature aggregation operations may be the minimum value function, the maximum value function, the averaging function, or the summing function. Based on the application of the one or more numeric feature aggregation operations, a one or more numeric aggregate features may be determined. In an example, the one or more numeric aggregate features may be a numeric feature having a minimum value in the selected numeric column, a numeric feature having a maximum value in the selected numeric column, a sum of the numeric features of the selected numeric column, or an average of the numeric features of the selected numeric column.

At block 614, it may be determined whether the selected numeric column is the last numeric column. In an embodiment, the processor 204 may be configured to determine whether the selected numeric column is a last numeric column. In case the selected numeric column is not the last numeric column, then the flowchart 600 may move to the block 610. In case the selected numeric column is the last numeric column, then the flowchart 600 may move to the block 616.

At block 616, the one or more numeric aggregate features for each numeric column may be determined. In an embodiment, the processor 204 may be configured to determine the one or more numeric aggregate features for each numeric column of the selected linked table 114A. Upon determination of the one or more numeric aggregate features for each numeric column of the selected linked table 114A, the aggregate table (for example, the aggregate table 408) may be updated to include the one or more aggregate features for each numeric column under the one or more new columns of the updated aggregate table 408.

At block 618, a categorical column may be selected from the selected linked table 114A. In an embodiment, the processor 204 may be configured to select the categorical column from the selected linked table 114A. Herein, the categorical column may be a column of the selected linked table 114A that may include features of the categorical data type. In an example, the selected categorical column may include numeric features corresponding to names of customers.

At block 620, the one or more categorical feature aggregation operations may be applied on the selected categorical column. In an embodiment, the processor 204 may be configured to apply the one or more categorical feature aggregation operations on the selected categorical column. In an example, the one or more categorical feature aggregation operations may be the count aggregation function, the least common value function, the most common value function, the ratio, or a percentage of the least common value function to the most common value function. Based on the application of the one or more categorical feature aggregation operations, a one or more numeric categorical features may be determined. In an example, the one or more numeric aggregate features may be a categorical feature having a minimum count in the selected categorical column and a categorical feature having a maximum count in the selected categorical column.

At block 622, it may be determined whether the selected categorical column is a last categorical column. In an embodiment, the processor 204 may be configured to determine whether the selected categorical column is the last categorical column. In case the selected categorical column is not the last categorical column, then the flowchart 600 may move to the block 618. In case the selected categorical column is the last categorical column, then the flowchart 600 may move to block 624.

At block 624, the one or more categorical aggregate features for each categorical column may be determined. In an embodiment, the processor 204 may be configured to determine the one or more categorical aggregate features for each categorical column of the selected linked table 114A. Upon determination of the one or more categorical aggregate features for each categorical column of the selected linked table 114A, the aggregate table (for example, the aggregate table 408) may be updated to include the one or more aggregate features for each categorical column under the one or more new columns of the updated aggregate table 408. Thereafter, the updated aggregate table may be provided as input to the ML model 102A.

Although the flowchart 600 is illustrated as discrete operations, such as 602, 604, 606, 608, 610, 612, 614, 616, 618, 620, 622, and 624. However, in certain embodiments, such discrete operations may be further divided into additional operations, combined into fewer operations, or eliminated, depending on the particular implementation without detracting from the essence of the disclosed embodiments.

Figure 7:
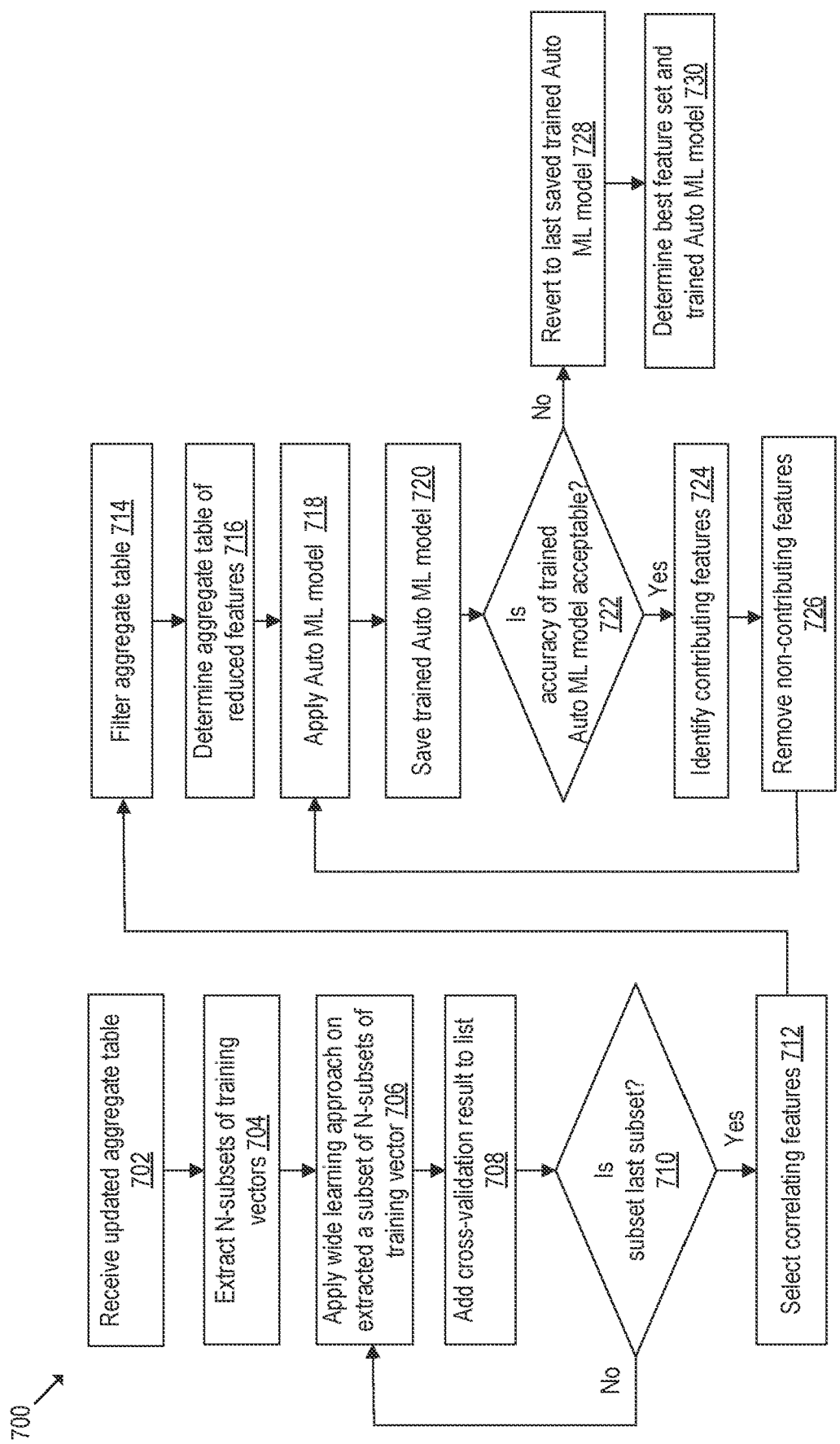
FIG. 7 is a diagram that illustrates a flowchart of an example method for filtering an updated aggregate table.

FIG. 7 is a diagram that illustrates a flowchart of an example method for filtering an updated aggregate table, in accordance with an embodiment of the disclosure. FIG. 7 is described in conjunction with elements from FIG. 1, FIG. 2, FIG. 3A, FIG. 3B, FIG. 4, FIG. 5, and FIG. 6. With reference to FIG. 7, there is shown a flowchart 700. The method illustrated in the flowchart 700 may start at 702 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, the updated aggregate table (for example, the updated aggregate table 316A) may be received. In an embodiment, the processor 204 may be configured to receive the updated aggregate table 316A. Details related to the updated aggregate table are further provided, for example, in FIG. 3A (at 316).

At block 704, the N-subsets of training vectors may be extracted. In an embodiment, the processor 204 may be configured to extract the N-subsets of training vectors.

Details related to the extraction of the N-subsets of training vectors are further provided, for example, in FIG. 3B (at 318).

At block 706, the wide learning approach may be applied on a subset of the extracted N-subsets of training vectors. In an embodiment, the processor 204 may be configured to apply the wide learning approach on the subset of the extracted N-subsets of training vectors. Details related to the application of the wide learning approach are further provided, for example, in FIG. 3B (at 320).

At block 708, a cross-validation result may be added to a list. In an embodiment, the processor 204 may be configured to add the cross-validation result to the list. Herein, based on the application of the wide learning approach on the subset of the N-subsets of training vectors, the cross-validation result for corresponding subset may be determined. The determined cross-validation result may be added to the list.

At block 710, it may be determined whether the subset of the N-subsets of training vectors is a last subset. In an embodiment, the processor 204 may be configured to determine whether the subset of the N-subsets of training vectors is the last subset. In case the subset of the N-subsets of training vectors is not the last subset, then the flowchart 700 may move to the block 706. In case the subset of the N-subsets of training vectors is the last subset, then the flowchart 700 may move to the block 712.

At block 712, correlating features may be selected. In an embodiment, the processor 204 may be configured to select correlating features. Herein, the processor 204 may be configured to identify the removable columns based on the correlation between columns in the selected subsets.

At block 714, the aggregate table may be filtered. In an embodiment, the processor 204 may be configured to filter the aggregate table. Herein, the aggregate table 316A may be filtered based on the removable columns. Details related to the filtration of the aggregate table are further provided, for example, in FIG. 3B (at 326).

At block 716, the aggregate table of reduced columns may be determined. In an embodiment, the processor 204 may be configured to determine the aggregate table of the reduced columns. Herein, the removable columns may be removed from the aggregate table.

At 718, an auto ML model may be applied on the aggregate table of reduced columns. In an embodiment, the processor 204 may be configured to apply the auto ML model on the aggregate table of reduced columns. The auto ML model may be trained on the aggregate table of reduced columns. In an example, the auto ML model may be "SapientML" model. It may be appreciated that the "SapientML" model may learn from the aggregate table of reduced columns to generate a high-quality pipeline for a predictive task on a new dataset.

At 720, trained auto ML model may be saved. In an embodiment, the processor 204 may be configured to save the auto ML model. In an example, the trained auto ML model may be stored in the database 106.

At 722, it may be determined whether the accuracy of the trained Auto ML model is acceptable. In an embodiment, the processor 204 may be configured to determine whether the accuracy of the trained auto ML model is acceptable. Herein, an accuracy of the trained auto ML model may be compared with a threshold accuracy. In case the accuracy of the trained auto ML model is greater than the threshold accuracy, then the flowchart 700 may move to the block 724. In case the accuracy of the trained auto ML model is lesser than the threshold accuracy, then the flowchart 700 may move to the block 728.

At 724, contributing feature may be identified. In an embodiment, the processor 204 may be configured to identify the contributing features. Herein, contributing features columns may be identified from the aggregate table of reduced columns.

At 726, non-contributing feature may be removed. In an embodiment, the processor 204 may be configured to remove the non-contributing features from the aggregate table of reduced columns. In an example, the aggregate table of reduced columns may be a column corresponding to the IDs of the customers, a column corresponding to ages of the customers, a column corresponding to addresses of the customers, a column corresponding to job natures of the customers, a column corresponding to items purchased by the customers, a column corresponding to dimensions of items purchased by the customers, and a column corresponding to payments modes. Herein, the column corresponding to ages of the customers and the column corresponding to job natures of the customers may be determined as non-contributing features. Therefore, the column corresponding to ages of the customers and the column corresponding to job natures of the customers may be removed from the aggregate table of reduced columns. Thereafter, the flowchart 700 may move to the block 714.

728, the trained auto ML model may be reverted to a last saved trained auto ML model. In an embodiment, the processor 204 may be configured to revert to the last saved trained auto ML model. In case the accuracy of the trained auto ML model is lesser than the threshold accuracy, then the trained auto ML model may be reverted to the last saved trained auto ML model.

At 730, a best feature set and the trained auto ML model may be determined. In an embodiment, the processor 204 may be configured to determine best feature set and the trained auto ML model. The contributing features columns associated with the last saved trained auto ML model may be determined as the best feature set. Based on the best feature set, the ML model 102A may be trained.

Although the flowchart 700 is illustrated as discrete operations, such as 702, 704, 706, 708, 710, 712, 714, 716, 718, 720, 722, 724, 726, 728, and 730. However, in certain embodiments, such discrete operations may be further divided into additional operations, combined into fewer operations, or eliminated, depending on the particular implementation without detracting from the essence of the disclosed embodiments.

Figure 8:
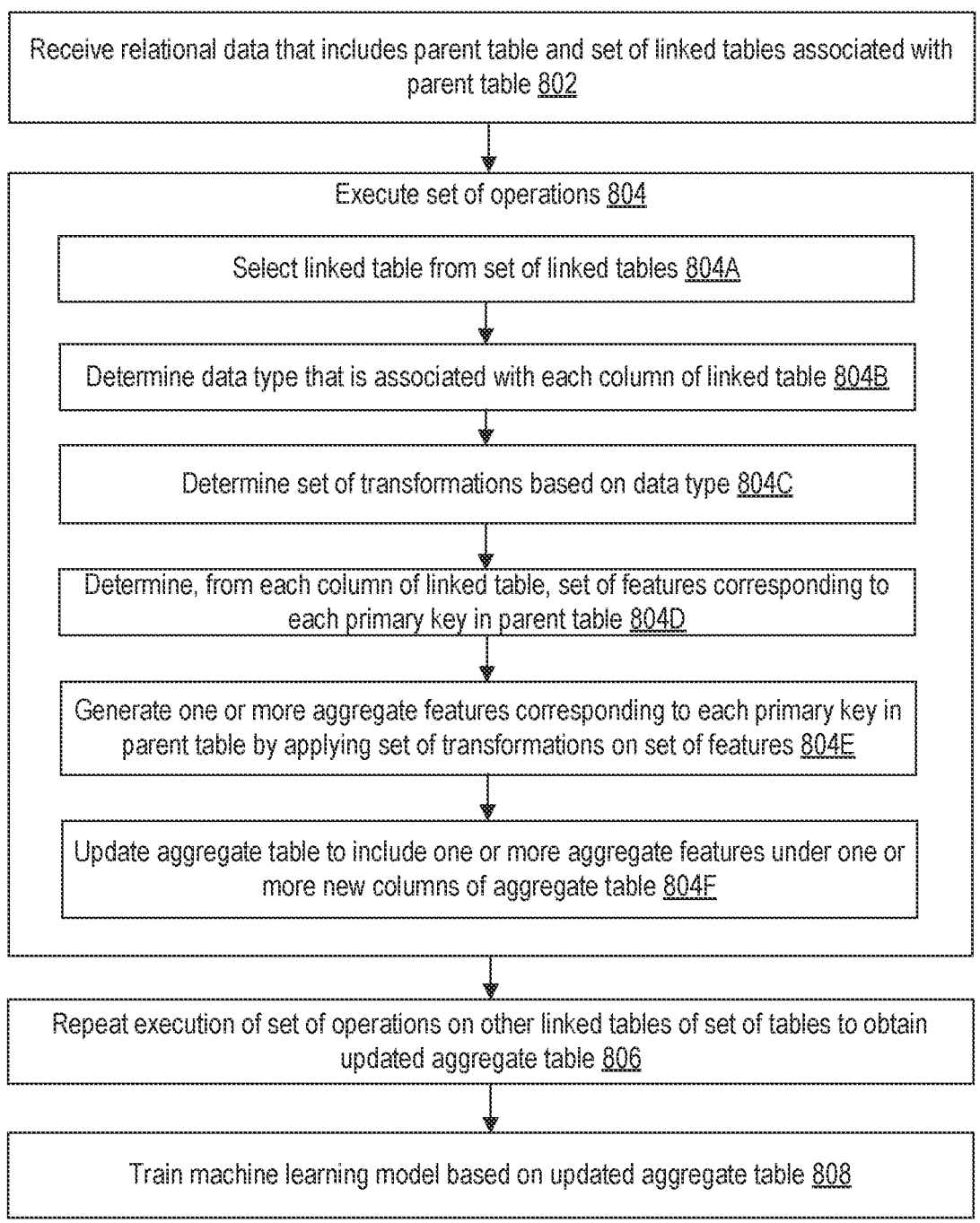
FIG. 8 is a diagram that illustrates a flowchart of an example method for data type-based aggregation of multiple linked tables for machine learning tasks.

FIG. 8 is a diagram that illustrates a flowchart of an example method for data type-based aggregation of multiple linked tables for machine learning tasks, in accordance with an embodiment of the disclosure. FIG. 8 is described in conjunction with elements from FIG. 1, FIG. 2, FIG. 3A, FIG. 3B, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as, by the example electronic device 102 or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, the relational data 110 that may include the parent table 112 and the set of linked tables 114 associated with the parent table 112 may be received. In an embodiment, processor 204 may be configured to receive the relational data 110 that may include the parent table 112 and the set of linked tables 114 associated with the parent table 112. Details related to the reception of the relational data 110 are further provided, for example, in FIG. 3A (at 302).

At block 804, the set of operations may be executed. In an embodiment, processor 204 may be configured to execute the set of operations.

At block 804A, the linked table 114A may be selected from the set of linked tables 114. In an embodiment, the set of operations may comprise selecting the linked table 114A from the set of linked tables 114. Details related to the selection of the linked table are further provided, for example, in FIG. 3A (at 304).

At block 804B, the data type that may be associated with each column of the selected linked table 114A may be determined. In an embodiment, the set of operations may further comprise determining the data type that may be associated with each column of the selected linked table 114A. Details related to the determination of the data type are further provided, for example, in FIG. 3A (at 306).

At block 804C, the set of transformations 308A may be determined based on the determined data type. In an embodiment, the set of operations may further comprise determining the set of transformations 308A based on the determined data type. Details related to the determination of the set of transformations 308A are further provided, for example, in FIG. 3A (at 308).

At block 804D, the set of features corresponding to each primary key in the parent table 112 may be determined from each column of the linked table 114A. In an embodiment, the set of operations may further comprise determining the set of features corresponding to each primary key in the parent table 112 from each column of the linked table 114A. Details related to the determination of the set of features are further provided, for example, in FIG. 3A (at 310).

At block 804E, the one or more aggregate features corresponding to each primary key in the parent table 112 may be generated by applying the set of transformations 308A on the set of features. In an embodiment, the set of operations may further comprise generating the one or more aggregate features corresponding to each primary key in the parent table 112 by applying the set of transformations 308A on the set of features. Details related to the generation of the one or more aggregate features are further provided, for example, in FIG. 3A (at 312).

At block 804F, the aggregate table 408 may be updated to include the one or more aggregate features under one or more new columns of the aggregate table 408. In an embodiment, the set of operations may further comprise updating the aggregate table 408 to include the one or more aggregate features under one or more new columns of the aggregate table 408. Details related to the update of the aggregate table 408 are further provided, for example, in FIG. 4.

At block 806, the execution of the set of operations may be repeated on the other linked tables (for example, the linked table 114B) of the set of linked tables 114 to obtain the updated aggregate table 408. In an embodiment, the processor 204 may be further configured to repeat the execution of the set of operations on the other linked tables (for example, the linked table 114B) of the set of linked tables 114 to obtain the updated aggregate table 408. Details related to the repetition of the set of operations are further provided, for example, in FIG. 3A.

At block 808, the ML model 102A may be trained based on the updated aggregate table 408. In an embodiment, the processor 204 may be further configured to train the ML model 102A based on the updated aggregate table 408. Details related to the training of the ML model 102A are further provided, for example, in FIG. 3B.

Although the flowchart 800 is illustrated as discrete operations, such as 802, 804, 806, and 808. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as, the example electronic device 102) to perform operations. The operations may include receiving relational data (for example, the relational data 110 of FIG. 1) that includes a parent table (for example, the parent table 112 of FIG. 1) and a set of linked tables (for example, the set of linked tables 114 of FIG. 1) associated with the parent table 112. The operations may include executing a set of operations. The set of operations may comprise selecting a linked table (for example, the linked table 114A of FIG. 1) from the set of linked tables 114. The set of operations may further comprise determining a data type that may associated with each column of the selected linked table 114A. The set of operations may further comprise determining a set of transformations (for example, the set of transformations 308A of FIG. 3A) based on the determined data type. The set of operations may further comprise determining, from each column of the linked table 114A, a set of features corresponding to each primary key in the parent table 112. The set of operations may further comprise generating one or more aggregate features corresponding to each primary key in the parent table 112 by applying the set of transformations 308A on the set of features. The set of operations may further comprise updating an aggregate table (for example, the aggregate table 408 of FIG. 4) to include the one or more aggregate features under one or more new columns of the aggregate table 408. The operations may further include repeating the execution of the set of operations on other linked tables (for example, the linked table 114B of FIG. 1) of the set of linked tables 114 to obtain the updated aggregate table 408. The operations may include training a machine learning (ML) model (for example, the ML model 102A) based on the updated aggregate table 408.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to,"

the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor in an electronic device, comprising:
   receiving relational data that includes a parent table and a set of linked tables associated with the parent table;
   executing a set of operations comprising:
      selecting a linked table from the set of linked tables;
      determining a data type that is associated with each column of the linked table;
      determining a set of transformations based on the data type;
      determining, from each column of the linked table, a set of features corresponding to each primary key in the parent table;
      generating one or more aggregate features corresponding to each primary key in the parent table by applying the set of transformations on the set of features; and
      updating an aggregate table to include the one or more aggregate features under one or more new columns of the aggregate table;
   repeating the execution of the set of operations on other linked tables of the set of tables to obtain the updated aggregate table; and
   training a machine learning model based on the updated aggregate table.

2. The method according to claim 1, wherein the data type is at least one of a numeric data type, a date-time data type, a vector data type, or a categorical data type.

3. The method according to claim 1, wherein each feature in the set of features for a first column of the selected linked table is of a vector data type.

4. The method according to claim 3, wherein the set of transformations comprises:
   clustering the set of features into a set of clusters using a clustering method;
   selecting a cluster center for each feature of the set of features based on the set of clusters;
   determining a distance of each feature of the set of features to the selected cluster center; and
   updating the selected linked table to include:
      a first categorical column based on the cluster center for each feature of the set of features, and
      a first numeric column based on the distance for each feature of the set of features.

5. The method according to claim 4, wherein the one or more aggregate features are generated by:
   applying one or more categorical feature aggregation operations on the first categorical column; and
   applying one or more numeric feature aggregation operations on the first numeric column.

6. The method according to claim 4, wherein the clustering method is a K-means clustering method.

7. The method according to claim 1, wherein each feature in the set of features for a second column of the selected linked table is of a date-time data type.

8. The method according to claim 7, wherein the set of transformations comprises:
   selecting a first feature from the second column;
   determining a date-time difference of each feature of the set of features from the selected first feature;
   determining a periodic value of each feature of the set of features; and and
   updating the selected linked table to include:
      a second numeric column based on the date-time difference for each feature of the set of features, and
      a second categorical column based on the determined periodic value of each of each feature of the set of features.

9. The method according to claim 8, wherein the periodic value of each feature of the set of features is one or more of a month of a year, a week of the year, a day of the week, and a workhour.

10. The method according to claim 8, wherein the one or more aggregate features are generated by:
    applying one or more categorical feature aggregation operations on the second categorical column; and
    applying one or more numeric feature aggregation operations on the second numeric column.

11. The method according to claim 1, wherein each feature in the set of features for a third column of the selected linked table is of a numeric type or a categorical type.

12. The method according to claim 11, wherein the set of transformations includes one or more of:

applying one or more categorical feature aggregation operations that include one or more of a count aggregation function, a least common value function, a most common value function, a ratio of values corresponding to the least common value function and the most common value function, a ratio of percentage values corresponding to the least common value function and the most common value function on the third column; and applying one or more numeric feature aggregation operations that include one or more of the minimum value function, the maximum value function, an averaging function, or a summing function on the third column.

13. The method according to claim 1, further comprising:
extracting N-subsets of training vectors by sampling rows of the updated aggregate table;
applying a machine learning approach on the N-subsets of training vectors to determine a cross-validation result for each of the N-subsets of training vectors;
selecting subsets from the N-subsets of training vectors based on an accuracy score associated with the subsets;
identifying removable columns from the selected subsets based on a correlation between columns in the selected subsets; and
filtering the aggregate table based on the removable columns,
wherein the machine learning model is trained based on training vectors in the filtered aggregate table.

14. The method according to claim 13, wherein the training comprises using an automated machine learning method to iteratively train a candidate machine learning model while selectively removing columns of the filtered aggregate table after each training checkpoint, and
the candidate machine learning model is the trained machine learning model when the accuracy score associated with the candidate machine learning model is above a threshold.

15. One or more non-transitory computer-readable storage media configured to store instructions that, in response to being executed, cause an electronic device to perform operations, the operations comprising:
receiving relational data that includes a parent table and a set of linked tables associated with the parent table;
executing a set of operations comprising:
selecting a linked table from the set of linked tables;
determining a data type that is associated with each column of the linked table;
determining a set of transformations based on the data type;
determining, from each column of the linked table, a set of features corresponding to each primary key in the parent table;
generating one or more aggregate features corresponding to each primary key in the parent table by applying the set of transformations on the set of features; and
updating an aggregate table to include the one or more aggregate features under one or more new columns of the aggregate table;
repeating the execution of the set of operations on other linked tables of the set of tables to obtain the updated aggregate table; and
training a machine learning model based on the updated aggregate table.

16. The one or more non-transitory computer-readable storage media according to claim 15, wherein the data type is at least one of a numeric data type, a date-time data type, a vector data type, or a categorical data type.

17. The one or more non-transitory computer-readable storage media according to claim 15, wherein each feature in the set of features for a first column of the selected linked table is of a vector data type.

18. The one or more non-transitory computer-readable storage media according to claim 17, wherein the set of transformations comprises:
clustering the set of features into a set of clusters using a clustering method;
selecting a cluster center for each feature of the set of features based on the set of clusters;
determining a distance of each feature of the set of features to the selected cluster center; and
updating the selected linked table to include:
a first categorical column based on the cluster center for each feature of the set of features, and
a first numeric column based on the distance for each feature of the set of features.

19. The one or more non-transitory computer-readable storage media according to claim 18, wherein the one or more aggregate features are generated by:
applying one or more categorical feature aggregation operations on the first categorical column; and
applying one or more numeric feature aggregation operations on the first numeric column.

20. An electronic device, comprising:
a memory configured to store instructions; and
a processor, coupled to the memory, configured to execute the instructions to perform a process comprising:
receiving relational data that includes a parent table and a set of linked tables associated with the parent table;
executing a set of operations comprising:
selecting a linked table from the set of linked tables;
determining a data type that is associated with each column of the linked table;
determining a set of transformations based on the data type;
determining, from each column of the linked table, a set of features corresponding to each primary key in the parent table;
generating one or more aggregate features corresponding to each primary key in the parent table by applying the set of transformations on the set of features; and
updating an aggregate table to include the one or more aggregate features under one or more new columns of the aggregate table;
repeating the execution of the set of operations on other linked tables of the set of tables to obtain the updated aggregate table; and
training a machine learning model based on the updated aggregate table.

* * * * *